US012353106B2

United States Patent
Song et al.

(10) Patent No.: US 12,353,106 B2
(45) Date of Patent: *Jul. 8, 2025

(54) LIQUID CRYSTAL DISPLAY DEVICE

(71) Applicant: Samsung Display Co., Ltd., Yongin (KR)

(72) Inventors: Jang-Kun Song, Seoul (KR); Yeon-Sik Ham, Suwon-si (KR); Kang-Woo Kim, Seoul (KR); Yeon-Mun Jeon, Iksan-si (KR); Jeong Hyun Lee, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/466,906

(22) Filed: Sep. 14, 2023

(65) Prior Publication Data

US 2024/0004250 A1  Jan. 4, 2024

Related U.S. Application Data

(63) Continuation of application No. 17/503,645, filed on Oct. 18, 2021, now Pat. No. 11,803,090, which is a
(Continued)

(30) Foreign Application Priority Data

Dec. 18, 2009  (KR) .................. 10-2009-0127314
Dec. 18, 2009  (KR) .................. 10-2009-0127315
Dec. 18, 2009  (KR) .................. 10-2009-0127316

(51) Int. Cl.
*G02F 1/136* (2006.01)
*G02F 1/1343* (2006.01)
(Continued)

(52) U.S. Cl.
CPC ...... *G02F 1/136286* (2013.01); *G02F 1/1343* (2013.01); *G02F 1/134336* (2013.01);
(Continued)

(58) Field of Classification Search
CPC ............. G02F 1/134336; G02F 1/1343; G02F 1/136227; G02F 1/136286; G02F 1/155;
(Continued)

(56) References Cited

U.S. PATENT DOCUMENTS 5,739,886 A * 4/1998 Shibahara ............. G02F 1/1368
349/139
6,128,061 A 10/2000 Lee et al.
(Continued)

FOREIGN PATENT DOCUMENTS

CN  1369730  9/2002
CN  1758124  4/2006
(Continued)

OTHER PUBLICATIONS

Kim et al.; "Refractive index properties of SiN thin films and fabrication of SiN optical waveguide", Electroceram (2006) 17:315-318.
(Continued)

*Primary Examiner* — Hoan C Nguyen
(74) *Attorney, Agent, or Firm* — CANTOR COLBURN LLP

(57) ABSTRACT

A liquid crystal display device includes a first substrate, a second substrate facing the first substrate, a dual passivation layer disposed between the first substrate and the second substrate. The dual passivation layer includes a first passivation layer and a second passivation layer. A refractive index of the first passivation layer is different from a refractive index of the second passivation layer.

10 Claims, 26 Drawing Sheets

Related U.S. Application Data continuation of application No. 16/434,430, filed on Jun. 7, 2019, now Pat. No. 11,150,529, which is a continuation of application No. 15/604,721, filed on May 25, 2017, now Pat. No. 10,488,726, which is a continuation of application No. 14/322,567, filed on Jul. 2, 2014, now Pat. No. 9,664,968, which is a continuation of application No. 12/899,019, filed on Oct. 6, 2010, now Pat. No. 8,804,081.

(51) Int. Cl.
 *G02F 1/1362* (2006.01)
 *G02F 1/155* (2006.01)

(52) U.S. Cl.
 CPC .. *G02F 1/136227* (2013.01); *G02F 1/134345* (2021.01); *G02F 1/134363* (2013.01); *G02F 1/134381* (2021.01); *G02F 1/155* (2013.01); *G02F 2001/1552* (2013.01); *G02F 2201/50* (2013.01)

(58) Field of Classification Search
 CPC ....... G02F 1/134345; G02F 2001/1552; G02F 2201/50; G02F 1/134363; G02F 1/134381; G02F 1/134318; G02F 2001/1555; G02F 2001/134381; G02F 1/134309; G02F 1/133707; G02F 2001/134372; G02F 1/1368; G02F 1/133512; G02F 2201/124; G09G 3/3648; G09G 2300/0426; G09G 2300/0439; H01L 27/1214; H01L 27/12; H01L 29/786; H01L 29/78633; H01L 27/3248; H01L 27/3244; H01L 27/3262; H01L 27/3272; H01L 27/3276; H01L 29/41733; H01L 29/42384; H01L 51/5203
 See application file for complete search history.

(56) References Cited

U.S. PATENT DOCUMENTS

| | | | |
|---|---|---|---|
| 6,285,431 B2 | 9/2001 | Lyu et al. | |
| 6,466,289 B1 | 10/2002 | Lee | G02F 1/134363 349/141 |
| 7,202,929 B2 | 4/2007 | Ootsu et al. | |
| 7,379,145 B2* | 5/2008 | Chung | G02F 1/134363 349/111 |
| 7,440,063 B2 | 10/2008 | Choi et al. | |
| 7,782,415 B2 | 8/2010 | Sasaki | G02F 1/136286 349/43 |
| 8,072,569 B2 | 12/2011 | Kaneko | G02F 1/134363 349/141 |
| 8,115,882 B2 | 2/2012 | Nakao | G02F 1/136204 349/40 |
| 9,164,613 B2 | 10/2015 | Jeon | G02F 1/13338 |
| 2004/0070718 A1* | 4/2004 | Saigo | G02F 1/134363 349/141 |
| 2004/0201811 A1* | 10/2004 | Jun | G02F 1/133753 349/146 |
| 2004/0246424 A1 | 12/2004 | Sawasaki | G02F 1/136227 349/138 |
| 2005/0083466 A1* | 4/2005 | Lee | G02F 1/134363 349/141 |
| 2005/0140899 A1 | 6/2005 | Ko | G02F 1/134363 349/141 |
| 2006/0125990 A1 | 6/2006 | Lee | G02F 1/133512 349/141 |
| 2007/0002244 A1 | 1/2007 | Park | G02F 1/134363 349/141 |
| 2007/0002251 A1 | 1/2007 | Chang et al. | |
| 2007/0013853 A1* | 1/2007 | Saigo | G02F 1/134363 349/141 |
| 2007/0046883 A1 | 3/2007 | Shimizu et al. | |
| 2007/0153151 A1 | 7/2007 | Yang | |
| 2007/0171319 A1 | 7/2007 | Fujita | G02F 1/134309 349/123 |
| 2007/0273819 A1 | 11/2007 | Kawasaki et al. | |
| 2007/0296901 A1 | 12/2007 | Seo et al. | |
| 2008/0186440 A1* | 8/2008 | Lim | G02F 1/134363 349/141 |
| 2008/0239459 A1 | 10/2008 | Kang | G02F 1/1345 257/E21.598 |
| 2008/0266504 A1 | 10/2008 | Lee et al. | |
| 2009/0040449 A1 | 2/2009 | Jo | G02F 1/134363 349/187 |
| 2009/0101905 A1 | 4/2009 | Hayashi et al. | |
| 2009/0102994 A1* | 4/2009 | Oh | G02F 1/134363 349/139 |
| 2009/0109358 A1 | 4/2009 | Tanaka et al. | |
| 2009/0115951 A1 | 5/2009 | Jun | G02F 1/134363 349/141 |
| 2009/0122247 A1 | 5/2009 | Chang | |
| 2009/0185090 A1* | 7/2009 | Suzuki | G02F 1/134363 349/39 |
| 2009/0201455 A1 | 8/2009 | Murai | G02F 1/134363 349/139 |
| 2009/0244464 A1 | 10/2009 | Kobayashi | |
| 2009/0284677 A1 | 11/2009 | Shin | H01L 27/124 438/30 |
| 2010/0013360 A1 | 1/2010 | Baborowski | H03H 3/04 310/370 |
| 2010/0103360 A1 | 4/2010 | Shimomaki | |
| 2012/0162162 A1 | 6/2012 | Kong et al. | |
| 2015/0062510 A1 | 3/2015 | Chang | G02F 1/134336 349/110 |
| 2015/0062522 A1 | 3/2015 | You | G02F 1/134363 445/24 |

FOREIGN PATENT DOCUMENTS

| | | | | |
|---|---|---|---|---|
| CN | 1979313 | 6/2007 | | |
| CN | 101000871 | 7/2007 | | |
| CN | 101008750 | 8/2007 | | |
| CN | 101165575 | 4/2008 | | |
| CN | 101241278 | 8/2008 | | |
| CN | 101248388 | 8/2008 | | |
| CN | 101436602 | 5/2009 | | |
| JP | 10062802 | 3/1998 | | |
| JP | 10186407 | 7/1998 | | |
| JP | 2002169179 | 6/2002 | | |
| JP | 2002221736 | 8/2002 | | |
| JP | 200231455 A | 10/2002 | | |
| JP | 2003207803 A | 7/2003 | | |
| JP | 2003262750 | 9/2003 | | |
| JP | 2005257883 A | 9/2005 | | |
| JP | 2006317516 | 11/2006 | | |
| JP | 2007034151 A * | 2/2007 | ....... | G02F 1/134363 |
| JP | 2007102069 A | 4/2007 | | |
| JP | 2008065212 | 3/2008 | | |
| JP | 2008065300 | 3/2008 | | |
| JP | 2008083386 A | 4/2008 | | |
| JP | 2008170987 A | 7/2008 | | |
| JP | 2009008877 | 1/2009 | | |
| JP | 2009069816 | 4/2009 | | |
| JP | 2009116334 A | 5/2009 | | |
| JP | 2009162981 A | 7/2009 | | |
| JP | 2009168878 A | 7/2009 | | |
| JP | 2009192932 A | 8/2009 | | |
| JP | 2009237108 | 10/2009 | | |
| JP | 2009271389 | 11/2009 | | |
| KR | 1020020041426 | 6/2002 | | |
| KR | 1020020070756 | 9/2002 | | |
| KR | 1020030011692 | 2/2003 | | |
| KR | 1020050001953 A | 1/2005 | | |
| KR | 1020050053826 A | 6/2005 | | |
| KR | 1020070000584 | 1/2007 | | |
| KR | 1020070001652 | 1/2007 | | |
| KR | 20070023997 A | 3/2007 | | |
| KR | 1020070078389 | 7/2007 | | |
| KR | 1020080003078 A | 1/2008 | | |

(56) References Cited

FOREIGN PATENT DOCUMENTS

| | | | |
|---|---|---|---|
| KR | 1020080005124 | | 1/2008 |
| KR | 1020080028818 | | 4/2008 |
| KR | 1020080062123 | A | 7/2008 |
| KR | 1020080112849 | A | 12/2008 |
| KR | 1020090030557 | A | 3/2009 |
| KR | 1020090041799 | A | 4/2009 |
| KR | 20090053610 | A * | 5/2009 |
| KR | 1020090047346 | | 5/2009 |
| KR | 1020090053609 | | 5/2009 |
| KR | 1020090083077 | A | 8/2009 |
| TW | 521171 | | 2/2003 |
| TW | 200923438 | | 6/2009 |
| TW | 200923521 | | 6/2009 |
| TW | I509317 | | 11/2015 |

OTHER PUBLICATIONS

"Sample disperson & relflective index guide" @Malvern Instrument 1996, 1997.

* cited by examiner

LIQUID CRYSTAL DISPLAY DEVICE

This application is a continuation of U.S. patent application Ser. No. 17/503,645, filed on Oct. 18, 2021, which is a continuation of U.S. patent application Ser. No. 16/434,430, filed on Jun. 7, 2019 and issued as U.S. Pat. No. 11,150,529 on Oct. 19, 2021, which is a continuation of U.S. patent application Ser. No. 15/604,721, filed on May 25, 2017 and issued as U.S. Pat. No. 10,488,726 on Nov. 26, 2019, which is a continuation of U.S. patent application Ser. No. 14/322,567, filed on Jul. 2, 2014 and issued as U.S. Pat. No. 9,664,968 on May 30, 2017, which is a continuation of U.S. patent application Ser. No. 12/899,019, filed on Oct. 6, 2010 and issued as U.S. Pat. No. 8,804,081 on Aug. 12, 2014, which claims priority to Korean Patent Application No. 10-2009-0127314, filed on Dec. 18, 2009, Korean Patent Application No. 10-2009-0127315, filed on Dec. 18, 2009 and Korean Patent Application No. 10-2009-0127316, filed on Dec. 18, 2009, the contents of which in their entireties are herein incorporated by reference.

BACKGROUND OF THE INVENTION

(1) Field of the Invention

The general inventive concept relates to a liquid crystal display device.

(2) Description of the Related Art

A liquid crystal display ("LCD") device, which is a widely used type of flat panel display, typically displays an image by applying voltages to electrodes disposed on substrates in the LCD to rearrange liquid crystal molecules in a liquid crystal layer interposed between the electrodes, thereby controlling an amount of light transmitted through the liquid crystal layer.

The LCD has an advantage of being thin, relative to other types of display devices, but side visibility is typically lower than front visibility in the LCD. Accordingly, various types of liquid crystal arrays and/or driving methods have been developed in attempts to increase side visibility of the LCD. For example, in an attempt to improve the viewing angle of an LCD, the LCD may include a substrate on which both a pixel electrode and a reference electrode are disposed.

However, when the LCD includes the substrate on which both the pixel electrode and the reference electrode are disposed, parasitic capacitance between the pixel and reference electrodes and a data line is induced. However, when an interval between the pixel and reference electrodes and the data line is widened, to reduce the parasitic capacitance therebetween, transmittance of the LCD is reduced.

Additionally, the transmittance is further reduced due to a reduction reaction of the pixel and reference electrodes during a manufacturing process of the pixel electrode and the reference electrode that uses a transparent material.

BRIEF SUMMARY OF THE INVENTION

In an exemplary embodiment, a liquid crystal display device includes a first substrate, a second substrate facing the first substrate, a dual passivation layer disposed between the first substrate and the second substrate. The dual passivation layer includes a first passivation layer and a second passivation layer, where a refractive index of the first passivation layer is different from a refractive index of the second passivation layer.

In an exemplary embodiment, a liquid crystal display device includes a first substrate, a second substrate facing the first substrate, a liquid crystal layer interposed between the first substrate and the second substrate, a gate line disposed between the first substrate and the liquid crystal layer, a data line disposed between the first substrate and the liquid crystal layer, a reference voltage line disposed between the first substrate and the liquid crystal layer, a pixel connected to the gate line and the data line. The pixel includes a thin film transistor connected to a first portion of the data line, a first electrode connected to the thin film transistor and including an opening formed therein overlapping the thin film transistor, and a second electrode disposed between the first electrode and the liquid crystal layer. The second electrode includes a first connection part disposed substantially parallel to the data line, a second connection part disposed substantially parallel to the gate line and connected to the first connection part and a branch electrode which includes a first part, a second part connected to the first part; and a third part connected to the first part and the second connection part. The second part forms a first angle with the first part, the third part forms a second angle with the first part and a third angle with the second connection part, and a first opening is formed in the second electrode overlapping the thin film transistor and the first portion of the data line.

In an exemplary embodiment, a liquid crystal display device includes a first substrate, a second substrate facing the first substrate, a liquid crystal layer interposed between the first substrate and the second substrate, a data line disposed on the first substrate, and a pixel disposed adjacent to the data line. The pixel includes a reference electrode disposed between the first substrate and the liquid crystal layer, and a pixel electrode disposed between the first substrate and the reference electrode.

BRIEF DESCRIPTION OF THE DRAWINGS

The above and other aspects of the present invention will become more readily apparent by describing in further detail exemplary embodiments thereof with reference to the accompanying drawings, in which.

DETAILED DESCRIPTION OF THE INVENTION

Figure 1:
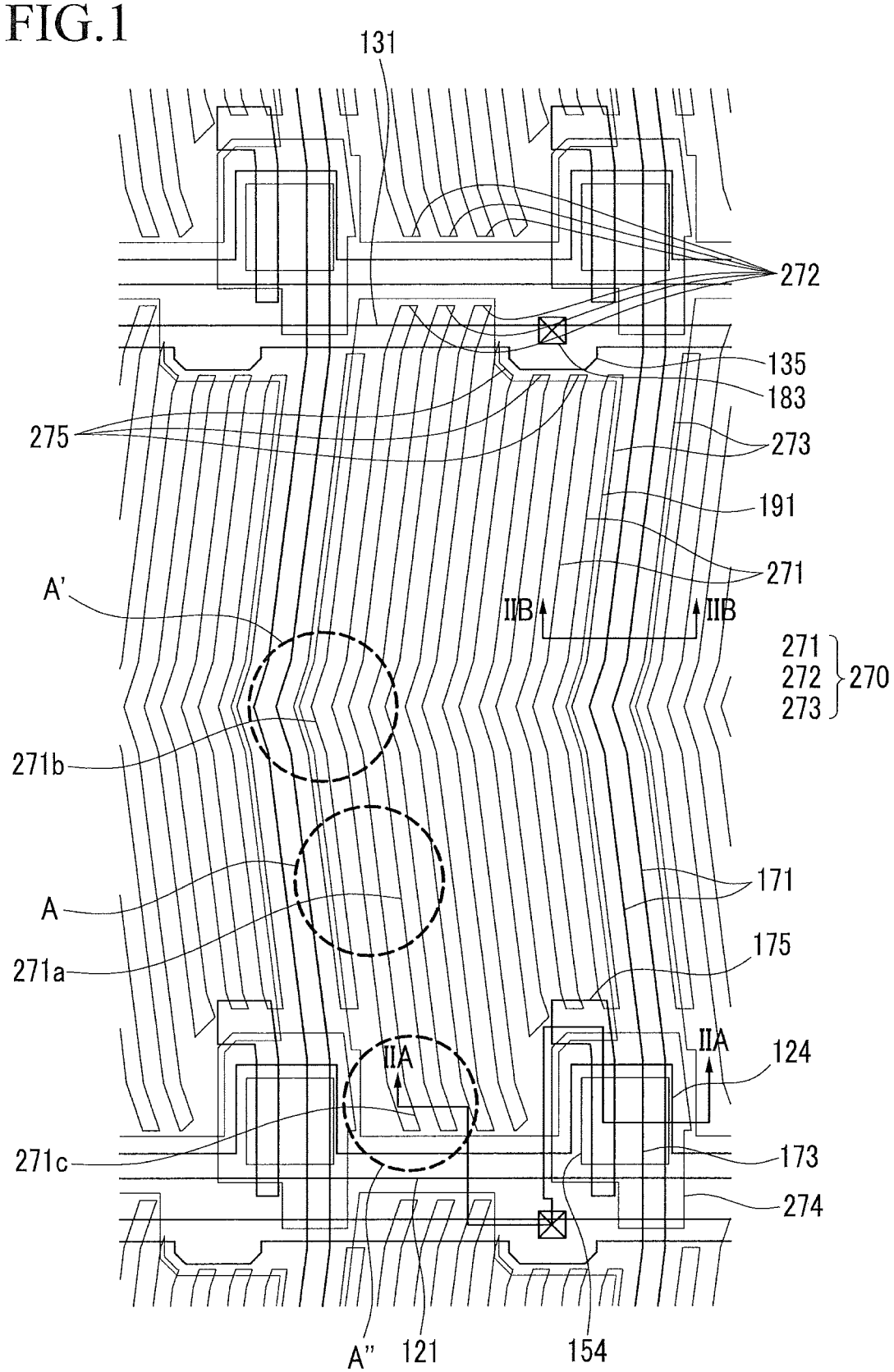
FIG. 1 is a plan view of an exemplary embodiment of a liquid crystal display ("LCD") device according to the present invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the present invention will be described in further detail with reference to the accompanying drawings.

Figure 2A:
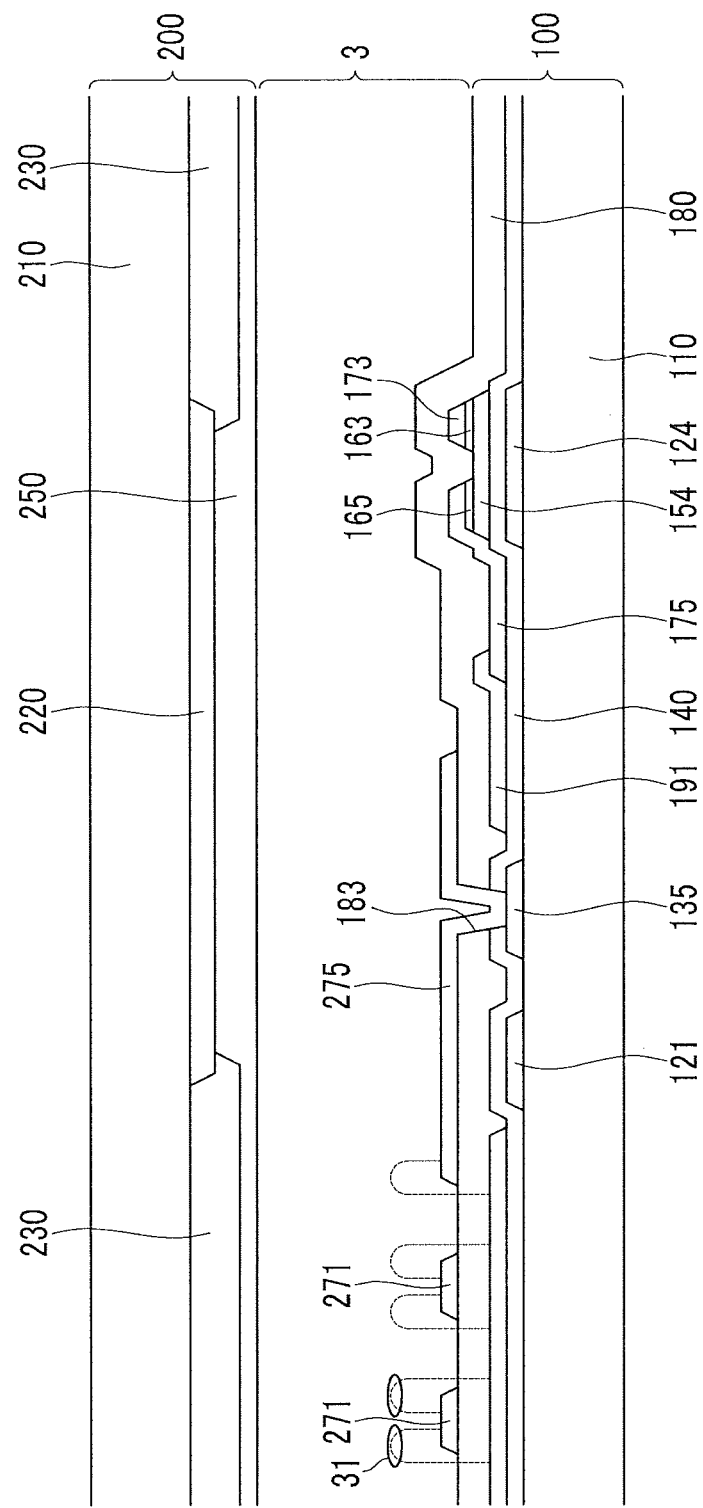
FIG. 2A is a partial cross-sectional view taken along line IIa-IIa of FIG. 1.
Figure 2B:
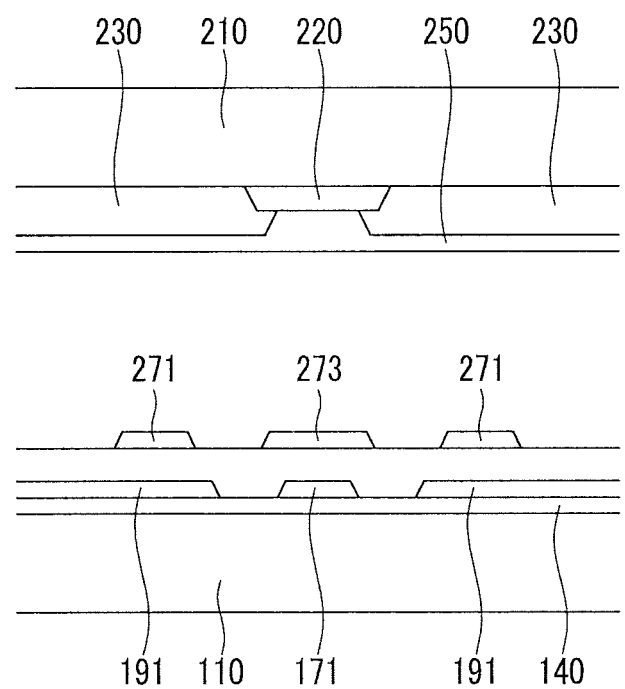
FIG. 2B is a partial cross-sectional view taken along line IIb-IIb of FIG. 1.

FIG. 1 is a plan view of an exemplary embodiment of a liquid crystal display device according to the present invention, FIG. 2A is a partial cross-sectional view taken along line IIa-IIa of FIG. 1, and FIG. 2B is a partial cross-sectional view taken along line IIb-IIb of FIG. 1.

Referring to FIGS. 1 and 2, a liquid crystal display device according to an exemplary embodiment includes a lower display panel 100 and an upper display panel 200 disposed opposite to, e.g., facing, the lower display panel 100, and a liquid crystal layer 3 interposed therebetween. The lower display panel 100 will now be described in greater detail.

A gate conductor including a gate line 121 and a reference voltage line 131 is disposed on an insulating substrate 110, which may be made of transparent glass or plastic, for example. The gate line 121 includes a gate electrode 124 and a wide end portion (not shown) which may be connected to other layers or an external driving circuit (not shown), for example. The gate line 121 may be made of an aluminum-based metal, such as aluminum (Al) or an aluminum alloy, for example, a silver-based metal, such as silver (Ag) or a silver alloy, for example, a copper-based metal, such as copper (Cu) or a copper alloy, for example, a molybdenum (Mo) based metal, such as molybdenum (Mo) or a molybdenum alloy, for example, chromium (Cr), tantalum (Ta), titanium (Ti), and other metals. In an exemplary embodiment, the gate line 201 may have a multilayer structure including at least two conductive layers, which may have different physical properties.

The reference voltage line 131 transmits a constant reference voltage and, more specifically, includes an expanded portion 135 connected to a reference electrode 270 and thereby transmits the reference voltage to the reference electrode 270. The reference voltage line 131 may be disposed substantially parallel to the gate line 121 along a first direction, e.g., a horizontal direction (as viewed in FIG. 1) and may be made of the same material as the gate line 121, although additional exemplary embodiments are not limited thereto.

A gate insulating layer 140, which may be made of silicon nitride (SiNx) or silicon oxide (SiOx), for example, is disposed on the gate lines 121 and reference voltage line 131. The gate insulating layer 140 may have a multilayer structure including at least two insulating layers, which may have different physical properties.

A semiconductor island 154, which may be made of amorphous silicon ("a-Si") or polysilicon ("p-Si"), for example, is disposed on the gate insulating layer 140. At least a portion of the semiconductor island 154 overlaps the gate electrode 124.

Ohmic contacts 163 and 165 are disposed on the semiconductor island 154. The ohmic contacts 163 and 165 may be made of materials such as n+ hydrogenated amorphous silicon, for example, that is doped with n-type impurity such as phosphorous (P), for example, at high concentration, or may be made of silicide. The ohmic contacts 163 and 165 may be disposed in pairs on a corresponding semiconductor island 154.

The data line 171 including the source electrode 173 and a data conductor including a drain electrode 175 are disposed on the ohmic contacts 163 and 165 and the gate insulating layer 140.

The data line 171 includes a wide end portion (not shown) connected to other layers or an external driving circuit (not shown), for example. The data line 171 transmits a data signal, and extends along a second direction, e.g., a vertical direction (as viewed in FIG. 1), which is substantially perpendicular to the first direction, and thereby intersects with the gate line 121 and the reference voltage line 131. In an exemplary embodiment, the data line 171 and the gate line 121 may define a pixel area, but additional exemplary embodiments are not limited thereto.

In an exemplary embodiment, the data line 171 may include a first curved part including a chevron-like shape, e.g., a "V" shape, proximate to an intermediate, e.g., central, area of the pixel area to substantially improve transmittance of the liquid crystal display device according to one or more exemplary embodiments. The data line 171 may further include a second curved part connected to the first curved part and forming a predetermined angle with the first curved part.

More specifically, for example, in an exemplary embodiment, the first curved part of the data line 171 may form an angle of about 7 angular degrees (°) with a rubbing direction of an alignment layer. The second curved part, which is disposed in the intermediate area of the pixel area, may extend from the first curved part to form an angle in a range of about 7° through about 15° with the first curved part.

The source electrode 173 is a portion of the data line 171 and is disposed along the data line 171. The drain electrode 175 extends along a direction substantially parallel to the source electrode 173. In an exemplary embodiment, the drain electrode 175 may be disposed substantially parallel to the data line 171, e.g., along the second direction.

The gate electrode 124, the source electrode 173 and the drain electrode 175 form a thin film transistor ("TFT") along with the semiconductor island 154, and a channel of the thin film transistor is disposed on the semiconductor island 154 between the source electrode 173 and the drain electrode 175.

In an exemplary embodiment, the liquid crystal display device may further include the source electrode 173 disposed on a same line on which the data line 171 is disposed and the drain electrode 175 disposed substantially parallel to the data line 171. Accordingly, a width of the thin film transistor may be increased without expanding a required space for the data conductor, and the aperture ratio of the liquid crystal display device is thereby substantially increased.

In an exemplary embodiment, the data line 171 and the drain electrode 175 may be made of a metal, such as molybdenum (Mb), chromium (Cr), tantalum (Ta), titanium (Ti), copper (Cu) or an alloy/alloys thereof, for example, and may have a multilayer structure including a refractory metal layer (not shown) and a low resistance conductive layer (not shown). In an exemplary embodiment, the multilayer structure may have a double layer including a lower layer of chromium, molybdenum or an alloy/alloys thereof and an upper layer of aluminum or an alloy thereof, for example, a double layer including a lower layer of titanium or an alloy thereof and an upper layer of copper or an alloy thereof, for example, and a triple layer including a lower layer of molybdenum or an alloy thereof, an intermediate layer of aluminum or an alloy thereof, and an upper layer of molybdenum or an alloy thereof, for example. In additional exemplary embodiments, the data line 171 and/or the drain electrode 175 may be made of various metals or conductors including the above-mentioned materials. The width of the data line 171 may be about 3.5 micrometers (μm)±0.75 μm, but additional exemplary embodiments are not limited thereto.

A pixel electrode 191 is disposed on a portion of the drain electrode 175 and the gate insulating layer 140.

The pixel electrode 191 includes a pair of curved edges substantially parallel to a first curved part and a second curved part of the data line 171.

The pixel electrode 191 is disposed on the drain electrode 175 overlapping a portion of the drain electrode 175 and connected to the drain electrode 175.

The pixel electrode 191 may be made of a transparent material such as polycrystalline, single crystalline amorphous Indium tin oxide ("ITO") or indium zinc oxide ("IZO"), for example.

A passivation layer 180 is disposed on the data line 171 and the drain electrode 175, the exposed semiconductor island 154, and the pixel electrode 191. The passivation layer 180 may be made of inorganic insulator such as silicon nitride and silicon oxide, for example. In another exemplary embodiment, the passivation layer 180 may be made of an organic insulator and the surface thereof may be planarized. The organic insulator may have photosensitivity, and the dielectric constant of the organic insulator may be about 4.0 or less. In an exemplary embodiment, the passivation layer 180 may have a double-layer structure, including a lower inorganic layer and an upper organic layer, which substantially improves insulating characteristic and effectively protects the exposed part of the semiconductor island 154. The thickness of the passivation layer 180 may be more than about 5000 angstroms (Å). In another exemplary embodiment, the thickness of the passivation layer 180 may be in a range of about 6000 Å through about 8000 Å.

The passivation layer 180 may include a contact hole (not shown) that exposes an end portion of the data line 171, and the passivation layer 180 and the gate insulating layer 140 include a contact hole 183 that exposes the expanded portion 135 of the reference voltage line 131 and a contact hole (not shown) that exposes the end part of the gate line 121.

The reference electrode 270 is disposed on the passivation layer 180. The reference electrode 270 overlaps the pixel electrode 191 and includes a branch electrodes 271, a horizontal connection part 272 connected to the branch electrodes 271, and a vertical connection part 273 connected to the horizontal connection part 272. The reference electrode 270 may be made of transparent conductive materials such as polycrystalline, single crystalline, amorphous ITO or IZO, for example. Reference electrodes 270 disposed in adjacent pixels are connected to each other.

The branch electrode 271 of the reference electrode 270 includes a first part 271a (shown in the dotted circle indicating portion A of FIG. 1) and a second part 271b (shown in the dotted circle indicating portion A' of FIG. 1) that are substantially parallel to the first curved part and second curved part of the data line 171, respectively. The first part 271a forms an angle in a range of about 5° through about 10° with the rubbing direction of the alignment layer. In an exemplary embodiment, the first part 271a forms an angle of about 7° with the rubbing direction of the alignment layer. The second part 271b may extend from the first part 271a forming an angle in a range of about 7° through about 15° with the first part 271a.

The horizontal connection part 272 of the reference electrode 270 is disposed substantially parallel to the gate line 121 and connected to the branch electrodes 271. The horizontal connection part 272 of the reference electrode 270 disposed on the lower part of the pixel area includes the gate electrode 124 that forms the TFT, the semiconductor island 154, the data line 171 that forms the source electrode 173, and a first opening part 274, e.g., a first opening 274, that exposes the drain electrode 175 and a portion of the reference voltage line 131. The horizontal connection part 272 of the reference electrode 270 has the reference electrode expanded portion 275 that extends along an expanded portion 135 of the reference voltage line 131. The reference electrodes 270 disposed in adjacent pixels are connected to each other.

The branch electrode 271 of the reference electrode 270 further includes a third part 271c (shown in the dotted circle indicating portion A") connected to the horizontal connection part 272 of the reference electrode 270, where the third part 271c may form an angle in a range of about 7° through about 15° with the first part 271a. In an exemplary embodiment, an angle (which may be an acute angle) between the first part 271a of the branch electrode 271 of the reference electrode 270 and the horizontal connection part 272 is greater than an angle (which may be an acute angle) between the second part 271b and the horizontal connection part 272 or an angle (which may be an acute angle) between the third part 271c and the horizontal connection part 272 by an angle in a range of about 7° through about 15°. The vertical connection part 273 of the reference electrode 270 extends to overlap the data line 171 disposed between two adjacent pixels and includes the first opening part 274 disposed on a portion of the data line 171.

The first opening part 274 of the reference electrode 270 exposes the source electrode 173 portion of the data line 171 and may have a width in a range of about 30 μm through about 60 μm.

The expanded portion 275 of the reference electrode 270 is connected to the reference voltage line 131 through the contact hole 183 formed in the passivation layer 180 and the gate insulating layer 140.

In an exemplary embodiment, the alignment layer (not shown) may be disposed on the reference electrode 270 and the passivation layer 180, and the alignment layer may be a horizontal alignment layer and rubbed in a predetermined direction. More specifically, for example, the rubbing direction of the alignment layer may form an angle in a range of about 5° through 10° with the first part 271a of the branch electrode of the reference electrode 270. In another exemplary embodiment, the rubbing direction of the alignment layer may form an angle of about 7° with the first part 271a.

The upper display panel 200 will now be described in greater detail.

Still referring to FIGS. 1 and 2, a light blocking member 220 is disposed on an insulating substrate 210, which may be made of transparent glass or plastic, for example. The light blocking member 220 is also referred to as a black matrix 220, and prevents light leakage.

Color filters 230 are disposed on the insulating substrate 210. In an exemplary embodiment, the color filters 230 may be disposed in an area surrounded by the light blocking member 220 and may extend in a vertical direction along a column of a pixel electrode 191. Each color filter 230 may display one primary color of primary colors (e.g., red, green and blue).

An overcoat 250 is disposed on the color filters 230 and the light blocking member 220. The overcoat 250 may be made of an insulating material, e.g., an organic insulating material, and effectively prevents the color filters 230 from being exposed, and also provides a planarized plane. In one or more exemplary embodiments, the overcoat 250 may be omitted.

The liquid crystal layer 3 includes a nematic liquid crystal material having positive dielectric anisotropy. Liquid crystal molecules 31 of the liquid crystal layer 3 are aligned such that longitudinal axes of the liquid crystal molecules 31 are arranged substantially parallel to a plane defined by parallel facing surfaces of the lower display panel 100 and the upper display panel 200, and a direction of the longitudinal axes of the liquid crystal molecules 31 is spirally twisted about 90° with respect to the rubbing direction of the alignment layer from the lower display panel 100 to the upper display panel 200.

The pixel electrode 191 receives a data voltage from the drain electrode 175, and the reference electrode 270 receives a common voltage from the reference voltage line 131. The reference electrode 270 is connected to another reference electrode that receives the reference voltage, but the reference electrode 270 receives the reference voltage from a reference voltage applying unit (not shown) disposed outside of a display area through the reference voltage line 131 to prevent a voltage drop in the display area.

The pixel electrode 191 that receives the data voltage and the reference electrode 270 that receives the common voltage generate an electric field, and the liquid crystal molecule 31 of the liquid crystal layer 3 disposed between the pixel electrode 191 and the reference electrode 270 thereby rotates in a direction substantially parallel to the direction of the electric field. As described above, polarization of light transmitted through the liquid crystal layer is determined according to the rotated direction of the liquid crystal molecules 31.

Thus, the liquid crystal molecules 31 of the liquid crystal layer 3 of the liquid crystal display device rotate according to the electric field formed between the edge of the branch electrode 271 of the reference electrode 270 and the pixel electrode 191. In an exemplary embodiment, since the alignment layer is rubbed such that the liquid crystal molecules 31 of the liquid crystal layer 3 are aligned with a pre-tilt angle and the rubbing angle may be in a range of about 5° through about 10° (e.g., about 7°) with the branch electrode 271 of the reference electrode 270, the liquid crystal molecules 31 rotate rapidly in a pre-tilted direction.

The pixel electrode 191 of the liquid crystal display device is disposed between the gate insulating layer 140 and the passivation layer 180 and connected to the drain electrode 175 by covering a portion of the drain electrode 175, and the aperture ratio is thereby substantially increased.

In an exemplary embodiment, the liquid crystal display device includes a source electrode 173 disposed along a portion of the data line 171 and a drain electrode 175 extending substantially parallel to a portion of the data line 171. Accordingly, the width of the thin film transistor is substantially increased without requiring the widening of an area in which the data conductor is disposed, and the aperture ratio of the liquid crystal display device is thereby further increased.

In an exemplary embodiment, the reference electrode 270 disposed on the passivation layer 180 includes a gate electrode 124 of the TFT, the semiconductor island 154, and an opening part 74 that exposes a portion of the data line 171, e.g., the source electrode 173, and the drain electrode 175. Accordingly, the parasitic capacitance between the data line 171 and the reference electrode 270 is thereby substantially reduced.

Hereinafter, experimental results showing the parasitic capacitance reduction between the data line 171 and the reference electrode 270 will be described in further detail. Table 1 shows a ratio of measured values of the parasitic capacitance between the data line 171 and the reference electrode 270 for experimental groups of the liquid crystal display device relative to a control group, which is a conventional liquid crystal display device, as a percentage. Specifically, the parasitic capacitance between the data line 171 and the reference electrode 270 was measured from liquid crystal display devices including different shapes of the data line 171 and the drain electrode 175 that forms the thin film transistor of liquid crystal display device, different opening parts of the reference electrode 270, different line widths of the data line 171 and different thicknesses of the passivation layer 180.

TABLE 1

| | |
|---|---|
| A | 71.0% |
| B | 62.1% |
| C | 49.6% |

In Table 1, the parasitic capacitance between the reference electrode 270 and the data line 171 of the liquid crystal display device in the experimental groups are expressed as a percentage with respect to a parasitic capacitance between a reference electrode and a data line of a conventional liquid crystal display device including U-shaped drain electrode and an organic insulating layer disposed between the reference electrode and the data line. Group A includes liquid crystal display device having the source electrode 173 that is a portion of the data line 171 and disposed along the data line 171 and the drain electrode 175 extending substantially parallel to the data line 171, where the reference electrode 270 includes the gate electrode 124 that forms the thin film transistor, the semiconductor island 154, and the first opening part 274 that exposes the source electrode 173 that is a portion of the data line 171, the drain electrode 175, and a portion of the reference voltage line 131. Group B includes a liquid crystal display device, the same as the liquid crystal display device of Group A except for the line width of the data line formed at about 3.5 μm, and Group C includes a liquid crystal display device, the same as the liquid crystal display device of group B except for the thickness of the passivation layer 180 formed at about 8000 Å.

As shown in Table 1, the parasitic capacitance between the reference electrode 270 and the data line 171 of Group A is reduced to about 71.0% as compared to the conventional liquid crystal display device, the parasitic capacitance between the reference electrode 270 and the data line 171 of Group B is reduced to about 62.1% by controlling the line width of the data line 171 and the parasitic capacitance between the reference electrode 270 and the data line 171 of Group C is reduced to about 49.6% by controlling the thickness of the passivation layer 180.

As described above, an exemplary embodiment of a liquid crystal display device according to the present invention has substantially improved aperture ratio, substantially reduced parasitic capacitance between the data line 171 and the reference electrode 270, without a complicated manufacturing process, and, accordingly, a substantially reduced and/or effectively prevented deterioration of image quality due to the parasitic capacitance.

Figure 3A:
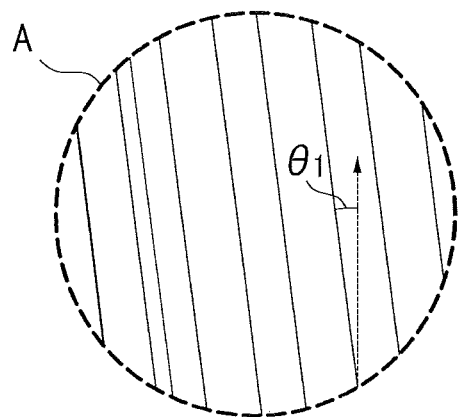
FIG. 3A is an enlarged view of portion A of FIG. 1.
Figure 3B:
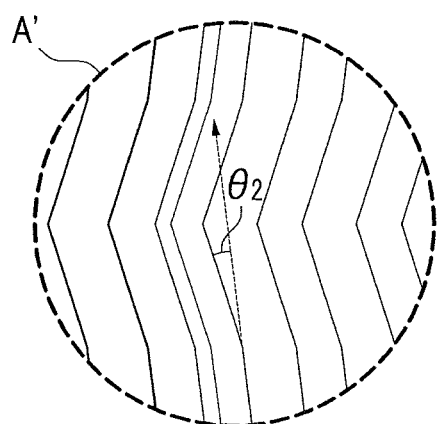
FIG. 3B is an enlarged view of portion A' of FIG. 1.
Figure 3C:
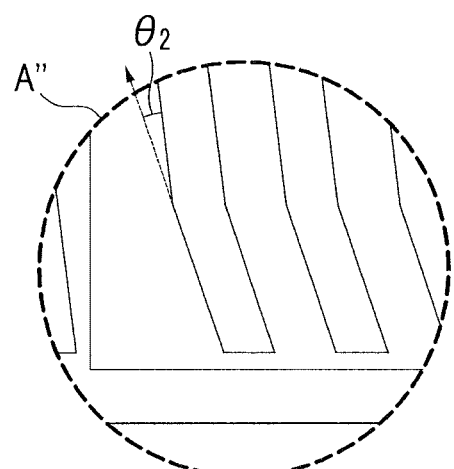
FIG. 3C is an enlarged view of portion A" of FIG. 1.

The shape of the branch electrode 271 of the reference electrode 270 according to an exemplary embodiment of the liquid crystal display device will now be described in further detail with reference to FIGS. 3A through 3C. FIG. 3A is an enlarged view of portion A of FIG. 1, which is the first part 271a of the reference electrode 270, FIG. 3B is an enlarged view of portion A' of FIG. 1, which is the second part 271b of the reference electrode 270, and FIG. 3C is an enlarged view of portion A" of FIG. 1, which is the third part 271c of the reference electrode 270.

Referring to FIG. 3A, the first part 271a of the branch electrode 271 of the reference electrode 270 is disposed in a direction forming a first angle 61 with the rubbing direction of the alignment layer disposed on the lower display panel 100. As described above, the first angle 61 may be in a range of about 5° through about 10° (e.g., about 7°). Referring to FIG. 3B, the second part 271b of the branch electrode 271 of the reference electrode 270 is disposed in a direction forming a second angle 62 with the first part 271a, and referring to FIG. 3C, the third part 271c of the reference electrode 270 is disposed in a direction forming the second angle 62 with the first part 271a. In an exemplary embodiment, the second angle 62 may be in a range of about 7° through about 15°.

As described above, the branch electrode 271 of the reference electrode 270 includes the first part 271a, the second part 271b and the third part 271c, and the direction of the electric filed generated at the central part and edge part of the pixel area is thereby changed. In a conventional liquid crystal display device, however, the direction of the electric field at the edge part of the branch electrode 271 is substantially different from the direction of the electric field at the central part of the branch electrode 271, and the aligned directions of the liquid crystal molecules are largely irregular when the electric field is generated in the liquid crystal layer 3, and an undesired texture is thereby generated in the image. In an exemplary embodiment, however, the liquid crystal display device includes the second part 271b and the third part 271c that form an angle with the rubbing direction greater than an angle that the first part 271a forms with the rubbing direction to adjust the direction of the electric field at the edge part and the central part of the branch electrode 271, and the liquid crystal molecules of the liquid crystal layer 3 are thereby aligned in a predetermined direction by rotating in predetermined directions. Accordingly, any texture due to irregular rotation of the liquid crystal molecule 31 at the central part or the upper and lower boundary part of the pixel area is effectively prevented.

In an exemplary embodiment, the branch electrode 271 of the reference electrode 270 includes the first part 271a, the second part 271b and the third part 271c for the liquid crystal molecules 31 to rotate in different directions when the electric field is generated by the branch electrodes 271, and the viewing angle of the liquid crystal display device is thereby substantially increased and the color tone is effectively compensated.

Another exemplary embodiment will now be described in further detail with reference to FIG. 4, which is a plan view of a liquid crystal display device according to the present invention.

Figure 4:
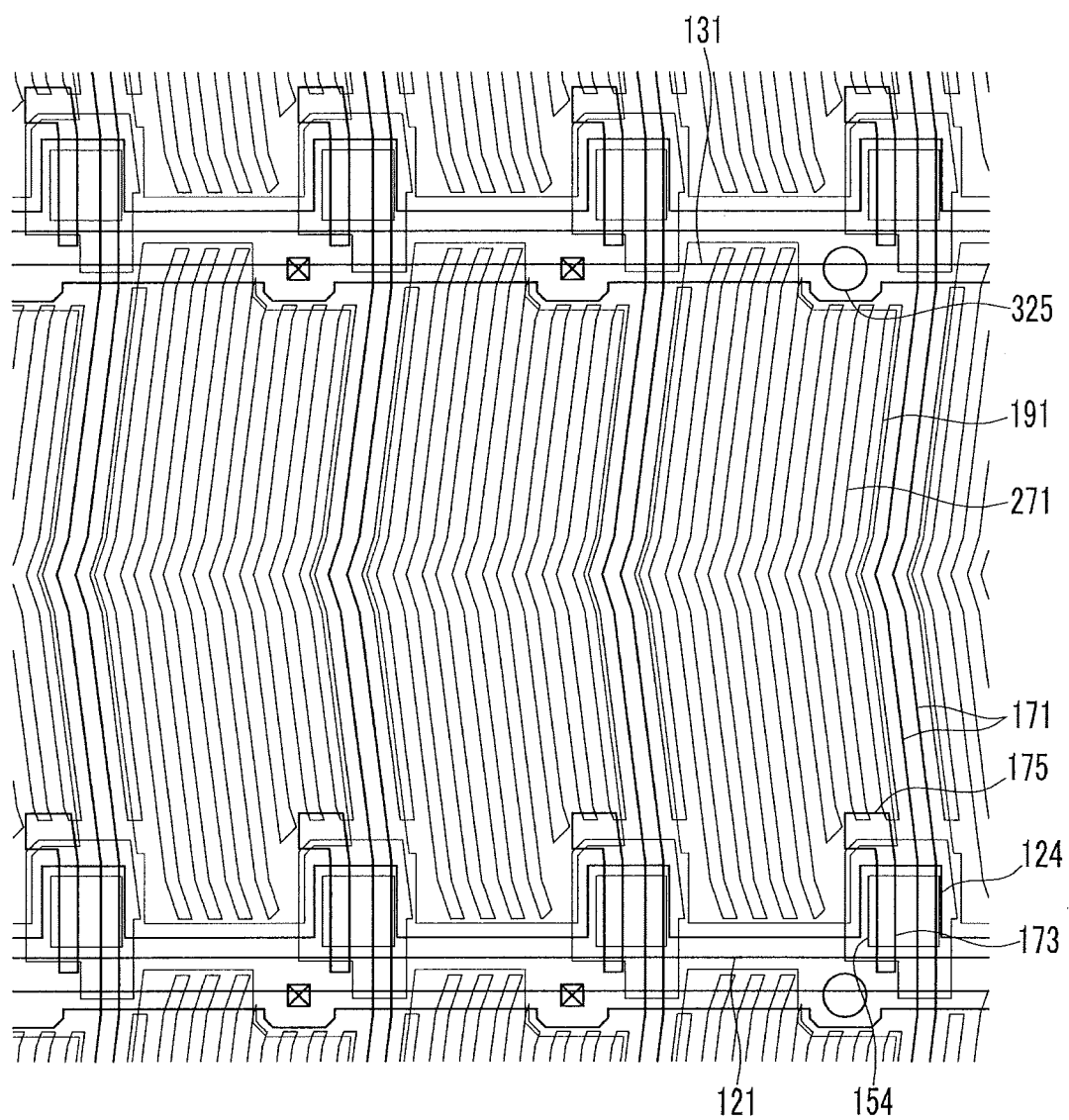
FIG. 4 is a plan view of another exemplary embodiment of a liquid crystal display device according to the present invention.

The structure of the liquid crystal display device of FIG. 4 is substantially the same as the structure of the exemplary embodiments of the liquid crystal display device shown in FIGS. 1 and 2 and described in greater detail above. The same or like elements shown in FIG. 4 have been labeled with the same reference characters as used in FIGS. 1 and 2, and any repetitive detailed description thereof will hereinafter be omitted or simplified.

As shown in FIG. 4, the liquid crystal display device includes at least three adjacent pixels, where a pixel of the at least three adjacent pixels includes a spacer 325. The spacer 325 may be disposed on the expanded portion 135 of the reference voltage line 131 and an area of the spacer 325 is greater than an area of the contact hole 183 that connects the reference voltage line 131 and the reference electrode 270.

In an exemplary embodiment, the pixel including the spacer 325 (of the at least three adjacent pixels) does not include the contact hole 183 that connects the reference voltage line 131 and the reference electrode 270, while the other pixels (of the at least three adjacent pixels) includes the contact hole 183. Therefore, the reference voltage line 131 and the reference electrode 270 may be connected through the contact hole 183 in a pixel area in which the spacer 325 is not disposed. When the spacer 325 is disposed on the contact hole 183, a pixel distance may be inaccurate due to a step difference caused by the contact hole 183. In an exemplary embodiment, the accuracy of the pixel distance is increased by disposing the spacer 325 only in a pixel where the contact hole 183 that connects the reference voltage line 131 and the reference electrode 270 is not formed.

A part of the light blocking member 220 corresponding to the spacer 325 disposed in the pixel including the spacer 325 among the three adjacent pixels is expended, and thereby covers the spacer 325. Therefore, the aperture ratio of the pixel in which the spacer 325 is disposed may be less than the aperture ratios of the other pixels.

The at least three adjacent pixels may display different colors, and the pixel including the spacer 325 has the smallest aperture ratio among the at least three adjacent pixels, and may be a green pixel. In an exemplary embodiment, yellow discoloration of the liquid display device is effectively prevented where the aperture ratio of a green pixel is smaller than the aperture ratios of other color pixels.

Figure 5:
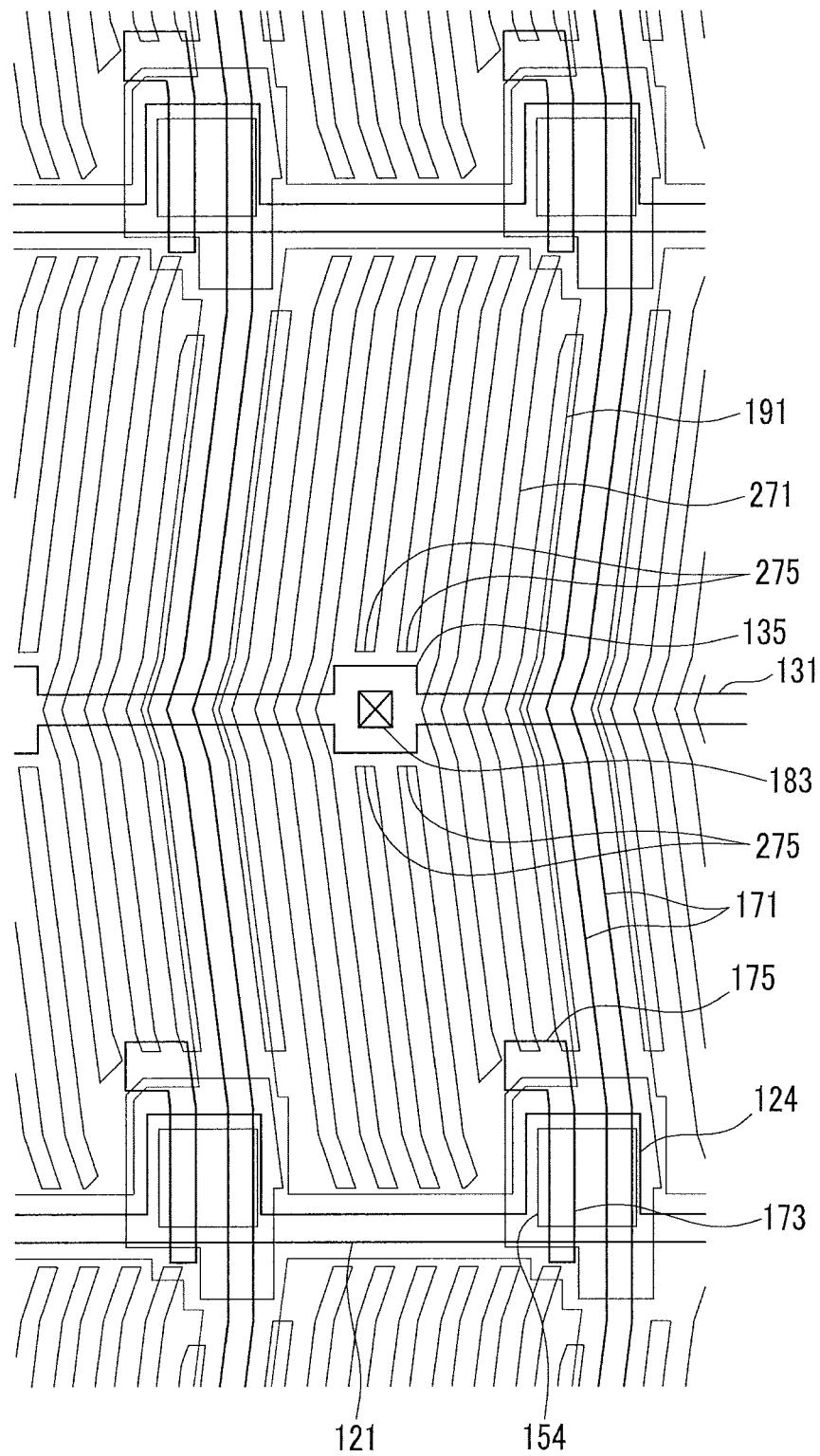
FIG. 5 is a plan view of still another exemplary embodiment of a liquid crystal display device according to the present invention.

Another exemplary embodiment of the liquid crystal display device will now be described in further detail with reference to FIG. 5. FIG. 5 is a plan view of a liquid crystal display device according to the present invention.

The structure of the liquid crystal display device of FIG. 5 is substantially the same as the structure the liquid crystal display device in FIGS. 1 and 2 except for the reference voltage line 131. The same or like elements shown in FIG. 5 have been labeled with the same reference characters as used above to describe the exemplary embodiments of the liquid crystal display device shown in FIGS. 1 and 2, and any repetitive detailed description thereof will hereinafter be omitted or simplified.

As described above, and in the exemplary embodiment of the liquid crystal display device shown in FIG. 5, the reference voltage line 131 is disposed at the central part of the pixel area, and the expanded portion 135 of the reference voltage line 131 is disposed in the central part of the pixel area and the expanded portion 275 of the reference electrode 270 is disposed in the central part of the pixel area.

The contact hole 183 that connects the reference voltage line 131 and the reference electrode 270, the expanded portion 135 of the reference voltage line 131, and the expanded portion 275 of the reference electrode 270 may be disposed in one pixel of three adjacent pixels, and the contact hole 183 may not be formed in other pixels of the three adjacent pixels. Therefore, the reference voltage line 131 and the reference electrode 270 can be connected through the contact hole 183 in the one pixel of the three neighboring pixels. A contact area of the reference voltage line 131 and the reference electrode 270 may be disposed adjacent to the data line 171.

In the one pixel where the reference voltage line 131 and the reference electrode 270 are connected to each other through the contact hole 183 of the three adjacent pixels, an edge of the pixel electrode 191 adjacent to the data line 171 may include a cutout 192 formed in a portion corresponding to the expanded portion 135 of the reference voltage line 131, the contact hole 183 and the expanded portion 275 of the reference electrode 270 and surrounding at least a portion of the contact area of the reference voltage line 131 and the reference electrode 270. Accordingly, the pixel electrode 191 disposed between the reference voltage line 131 and the reference electrode 270 is not overlapping the contact part of the reference voltage line 131 and the reference electrode 270, and a short between the reference electrode 270 and the pixel electrode 191 is thereby effectively prevented.

In an exemplary embodiment, when the contact hole 183 that connects the reference voltage line 131 and the reference electrode 270, the expanded portion 135 of the reference voltage line 131 and the expanded portion 275 of the reference electrode 270 are disposed in the one pixel of the three adjacent pixels, the aperture ratio of the one pixel where the reference voltage line 131 and the reference electrode 270 are connected may be less than the aperture ratios of the other pixels of the three adjacent pixels.

The three adjacent pixels may display different colors, and the one pixel where the reference voltage line 131 and the reference electrode 270 are connected and that has the less aperture ratio may be a green pixel.

As described above, by connecting the reference voltage line 131 and the reference electrode 270 only in a part of the pixels, the aperture ratios of the other pixels of the pixels can be increased, and the entire aperture ratio of the liquid crystal display device is thereby substantially increased. In an exemplary embodiment, the aperture ratio of the green pixel may be less than the aperture ratios of the other pixels displaying other colors, and yellow discoloration of the liquid crystal display device is thereby effectively prevented.

Figure 6A:
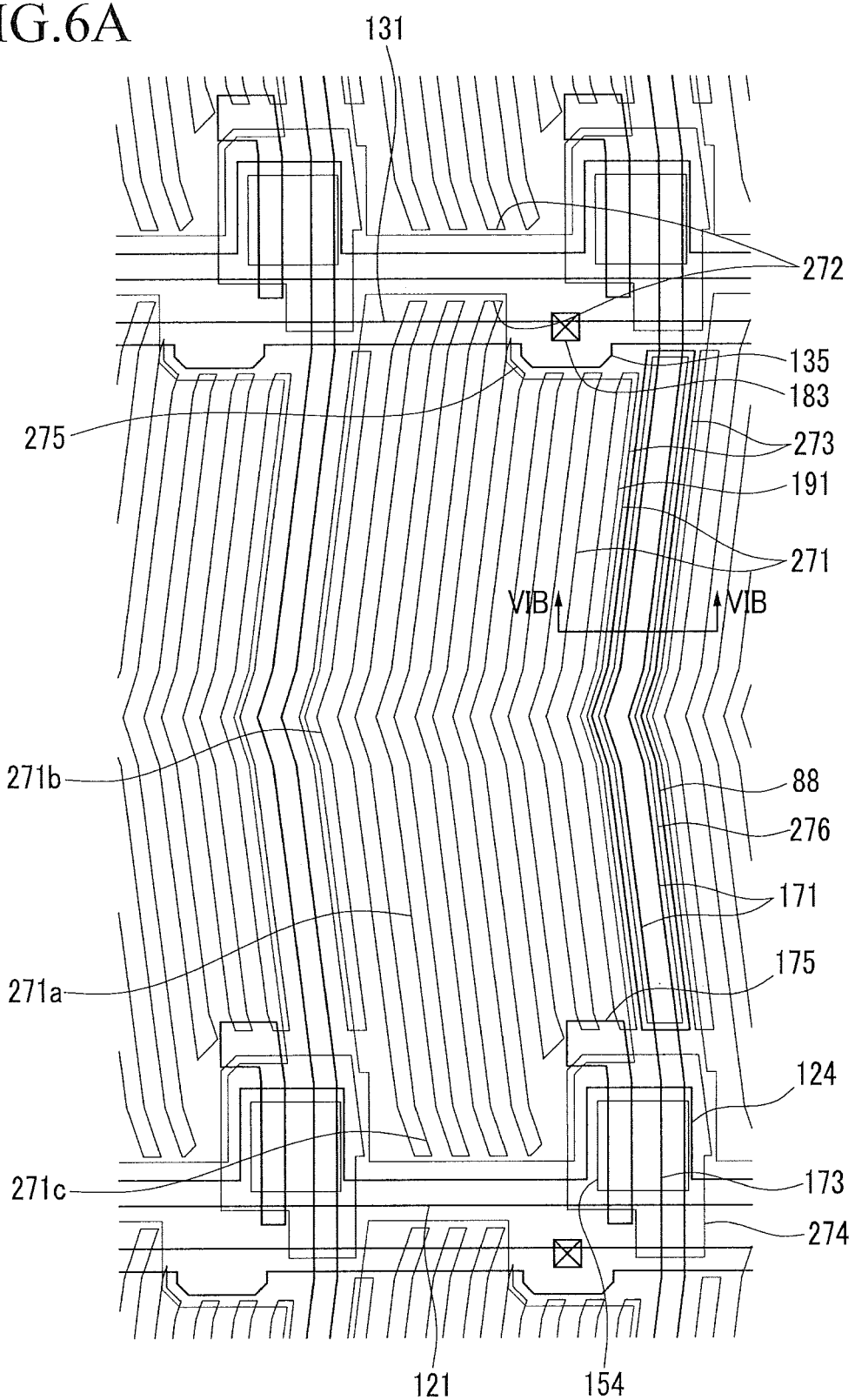
FIG. 6A is a plan view of yet another exemplary embodiment of a liquid crystal display device according to the present invention.

Another exemplary embodiment of the liquid crystal display device now will be described in further detail with reference to FIGS. 6A and 6B. FIG. 6A is a plan view of yet another exemplary embodiment of a liquid crystal display device according to the present invention, and FIG. 6B is a partial cross-sectional view taken along line VIB-VIB of FIG. 6A.

Figure 6B:
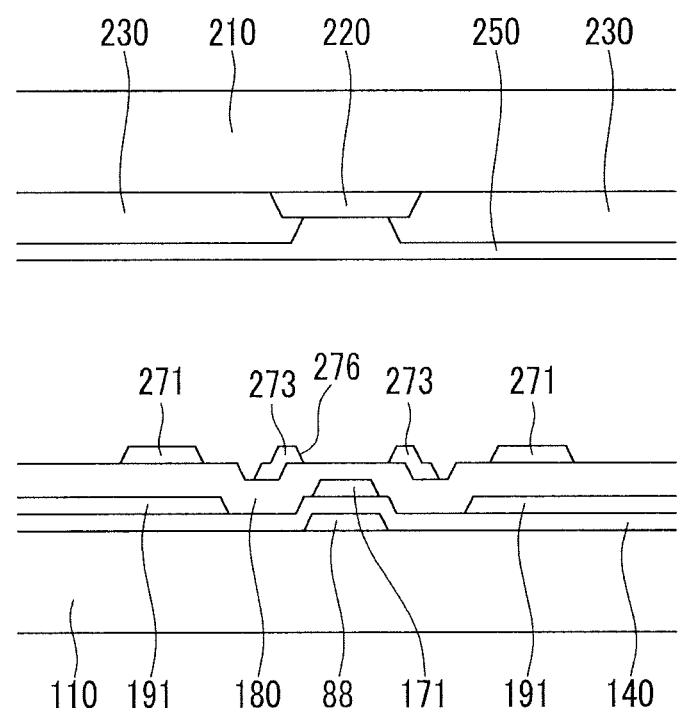
FIG. 6B is a partial cross-sectional view taken along line VIB-VIB of FIG. 6A.

The structure of the exemplary embodiment of the liquid crystal display device of FIGS. 6A and 6B is substantially the same as the structure the liquid crystal display in FIGS. 1 and 2 except that the liquid crystal display device of FIGS. 6A and 6B further includes a shielding electrode 88 and a second opening part 276, e.g., a second opening 276. The same or like elements shown in FIGS. 6A and 6B have been labeled with the same reference characters as used above to describe the exemplary embodiments of the liquid crystal display device shown in FIGS. 1 and 2, and any repetitive detailed description thereof will hereinafter be omitted or simplified.

As described above, the liquid crystal display device shown in FIGS. 6A and 6B includes the shielding electrode 88 disposed below the data line 171 and the second opening part 276 disposed above the data line 171 and formed in the vertical connection part 273 overlapping the data line 171. The shielding electrode 88 may be disposed in a same layer on which the gate conductor is disposed and may be floated. The shielding electrode 88 effectively prevents light leakage. The vertical length of the second opening part 276 of the reference electrode 270 disposed above the data line 171 may be greater than half of the vertical length of the data line 171 disposed in one pixel. As described above, a portion of the vertical connection part 273 of the reference electrode 270 disposed on the data line 171 is not overlapping the data line 171 by having the second opening part 276 formed therein, and the parasitic capacitance between the data line 171 and the reference electrode 270 is thereby substantially reduced.

Referring to FIG. 6B, a width d1 of the shielding electrode 88 may be in a range of about 8.2 µm through about 8.8 µm, and a distance d2 between the shielding electrode 88 and the pixel electrode 191 may be in a range of about 4.7 µm through about 5.3 µm. A width d3 of the data line 171 may be in a range of about 3.2 µm through about 3.8 µm, and a width d4 of the second opening 276 of the reference electrode 270 disposed on the data line 171 may be in a range of about 4.2 µm through about 4.8 µm. In an exemplary embodiment, the width d4 of the second opening 276 of the reference electrode 270 disposed on the data line 171 is greater than the width d3 of the data line 171, the data line 171 and the reference electrode 270 are not overlapping each other by the second opening 276, and the parasitic capacitance due to the overlap of the data line 171 and the reference electrode 270 is substantially reduced. In an exemplary embodiment, a width d5 of the branch electrode 271 of the reference electrode 270 may be in a range of about 4.2 µm through about 4.8 µm, the branch electrode 271 adjacent to the data line 171 and the shielding electrode 88 may overlap each other, and a width d6 of the overlapped part may be in a range of about 1.7 µm through about 2.3 µm.

Figure 7A:
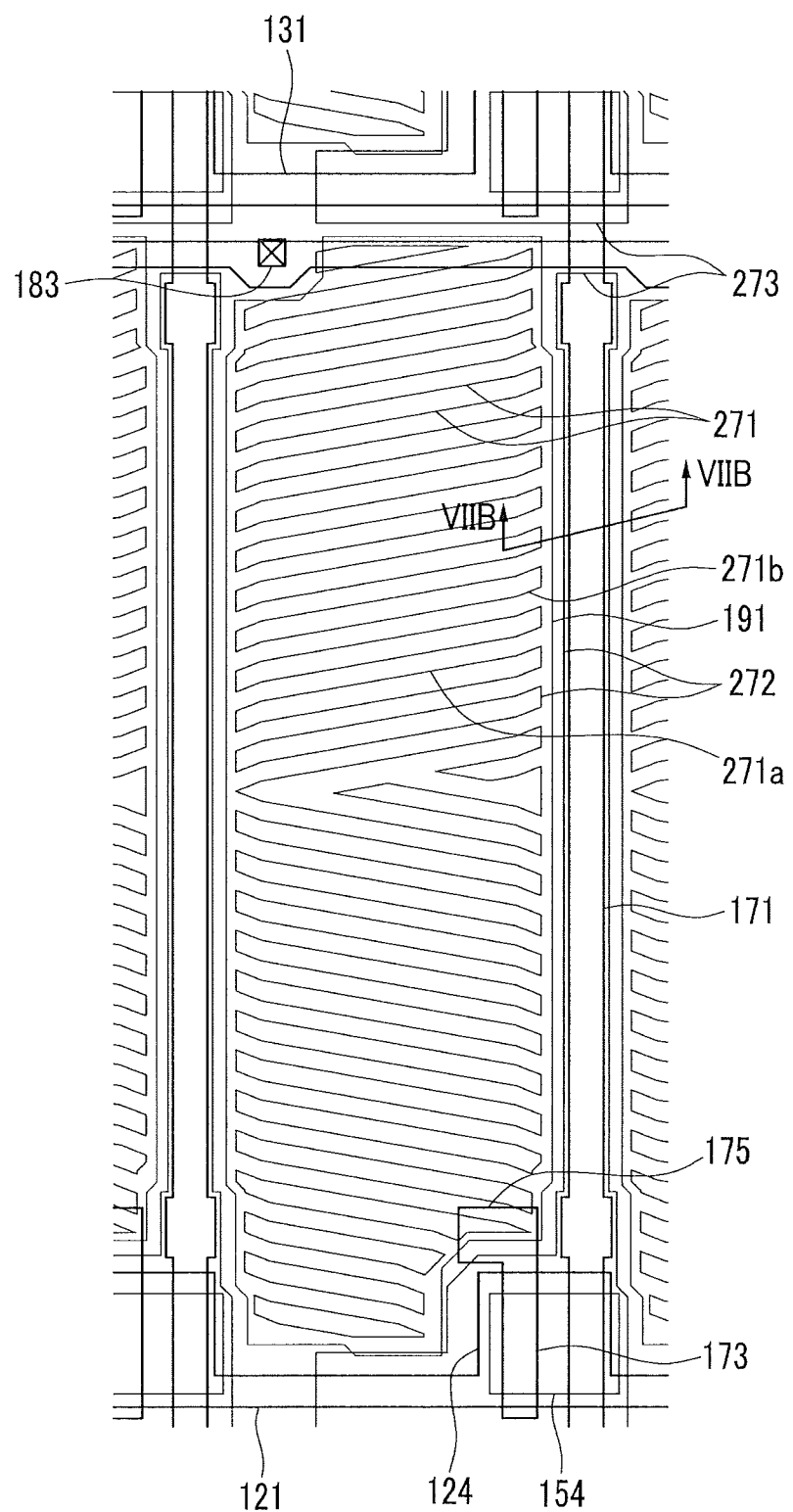
FIG. 7A is a plan view of another exemplary embodiment of a liquid crystal display device according to the present invention.

Another embodiment of the liquid crystal display device now will be described in further detail with reference to FIGS. 7A and 7B. FIG. 7A is a plan view of another exemplary embodiment of a liquid crystal display device according to the present invention, and FIG. 7B is a partial cross-sectional view taken along line VIIB-VIIB of FIG. 7A.

Figure 7B:
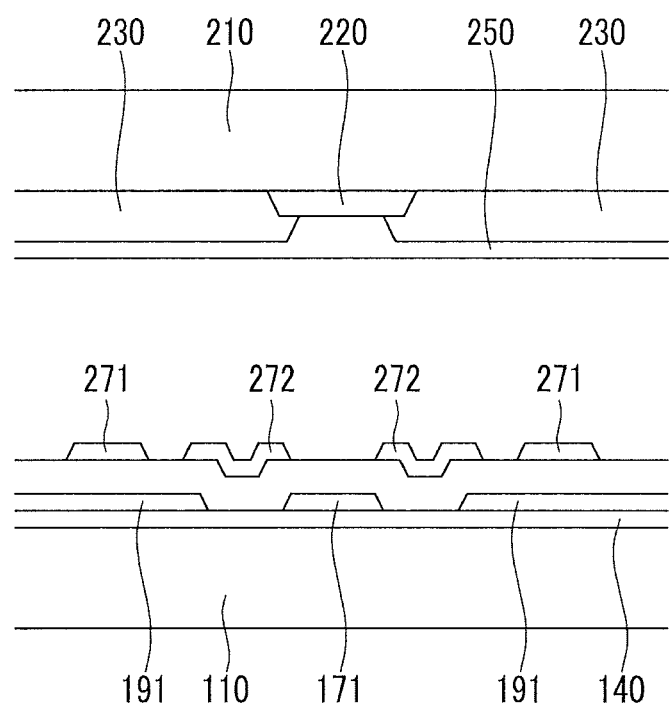
FIG. 7B is a partial cross-sectional view taken along line VIIB-VIIB of FIG. 7A.

The structure of the liquid crystal display device of FIGS. 7A and 7B is substantially similar to the structure the liquid crystal display device in FIGS. 1 and 2 except for the reference electrode 270. The same or like elements shown in FIGS. 7A and 7B have been labeled with the same reference characters as used above to describe the exemplary embodiments of the liquid crystal display device shown in FIGS. 1 and 2, and any repetitive detailed description thereof will hereinafter be omitted or simplified.

The gate line 121, which includes the gate electrode 124, and the reference voltage line 131 are disposed on the insulating substrate 110, and the gate insulating layer 140 is disposed on the gate line 121 and the reference voltage line 131. The semiconductor island 154, the ohmic contacts 163 and 165 are disposed on the gate insulating layer 140, and the data line 171 and the drain electrode 175, which include the source electrode 173, are disposed on the gate insulating layer 140 and the ohmic contacts 163 and 165. The pixel electrode 191 is disposed on the gate insulating layer 140 and a portion of the drain electrode 175, and the passivation layer 180 having the contact hole 183 is disposed on the pixel electrode 191, the data line 171, the drain electrode 175 and the exposed semiconductor island 154. The reference electrode 270 including the branch electrode 271 is disposed on the passivation layer 180, overlapping the pixel electrode 191.

As shown in FIG. 7A, the reference electrode 270 of the liquid crystal display device overlaps the pixel electrode 191, and includes a plurality of branch electrodes 271, a horizontal connection part 272 (hereinafter, the horizontal connection part will be referred to as the "first connection part") connected to the plurality of branch electrodes 271 and a vertical connection part 273 (hereinafter, the vertical connection part 273 will be referred to as the "second connection part") connected to the first connection part 272 and a reference electrode 270 disposed in an adjacent pixel.

The branch electrode 271 of the reference electrode 270 extends substantially parallel to the gate line 121. In another exemplary embodiment the branch electrode 271 may be disposed in a direction forming an angle in a range of about 5° through about 20° with the gate line 121. In an exemplary embodiment, the branch electrode 271 of the reference electrode 270 may be disposed in a direction forming an angle in a range of about 7° through about 13° (e.g., about 10°) with the rubbing direction of the alignment layer.

The branch electrode 271 of the reference electrode 270 includes a first part 271a extending from the branch electrode 271 and a second part 271b extending from an end of the first part 271a.

In an exemplary embodiment, the first part 271a of the branch electrode 271 of the reference electrode 270 forms an angle of about 10° with the rubbing direction of the arrangement layer, and the second part 271b may be disposed in a direction forming an angle in a range of about 7° through about 15° with the first part 271a.

Figure 8:
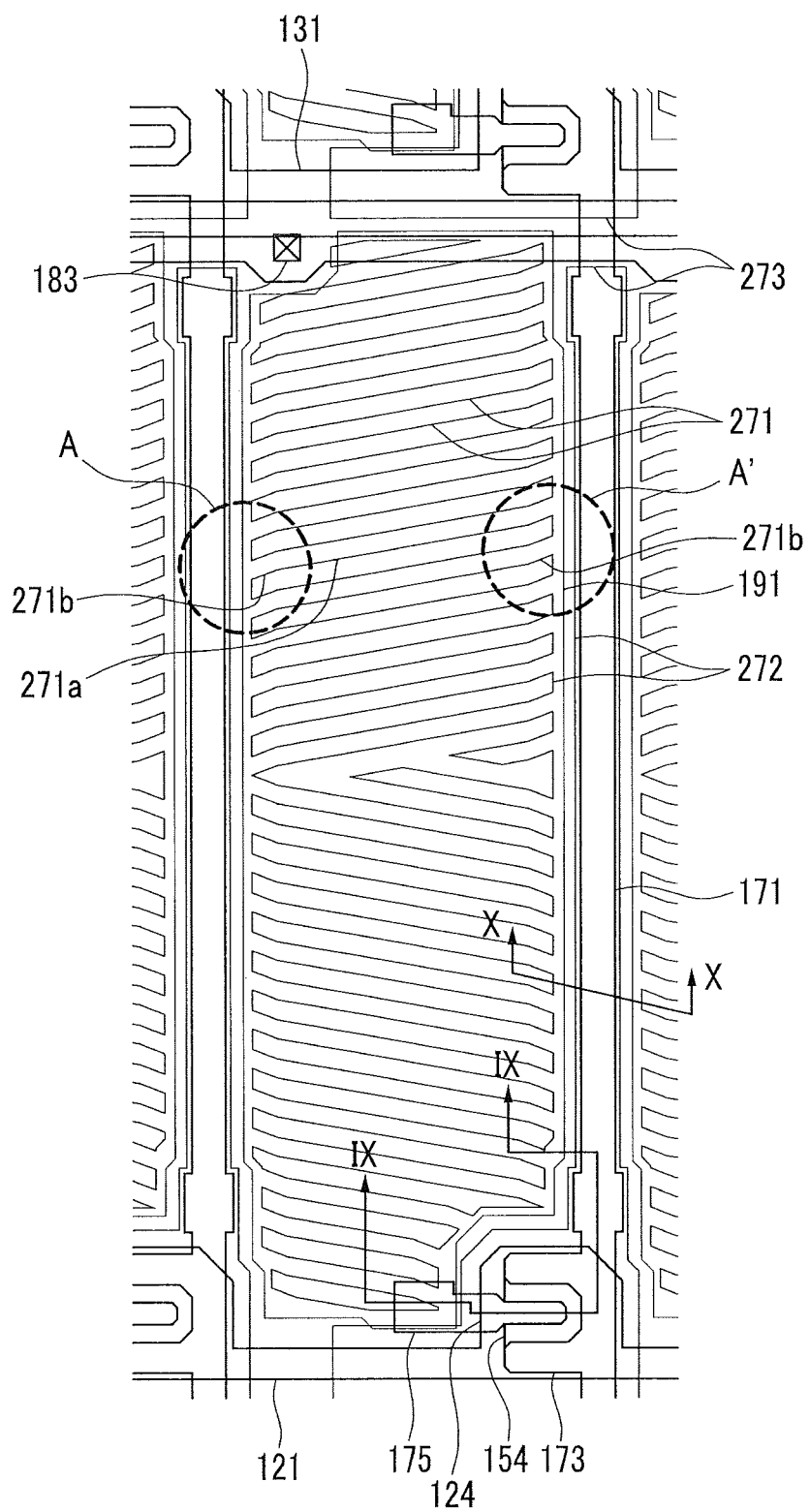
FIG. 8 is a plan view of still another exemplary embodiment of a liquid crystal display device according to the present invention.

Another embodiment of the liquid crystal display device now will be described in further detail with reference to FIGS. 8 through 10. FIG. 8 is a plan view of another exemplary embodiment of a liquid crystal display device according to the present invention, FIG. 9 is a partial cross-sectional view taken along line IX-IX of FIG. 8 and FIG. 10 is a partial cross-sectional view taken along line X-X of FIG. 8.

Figure 9:
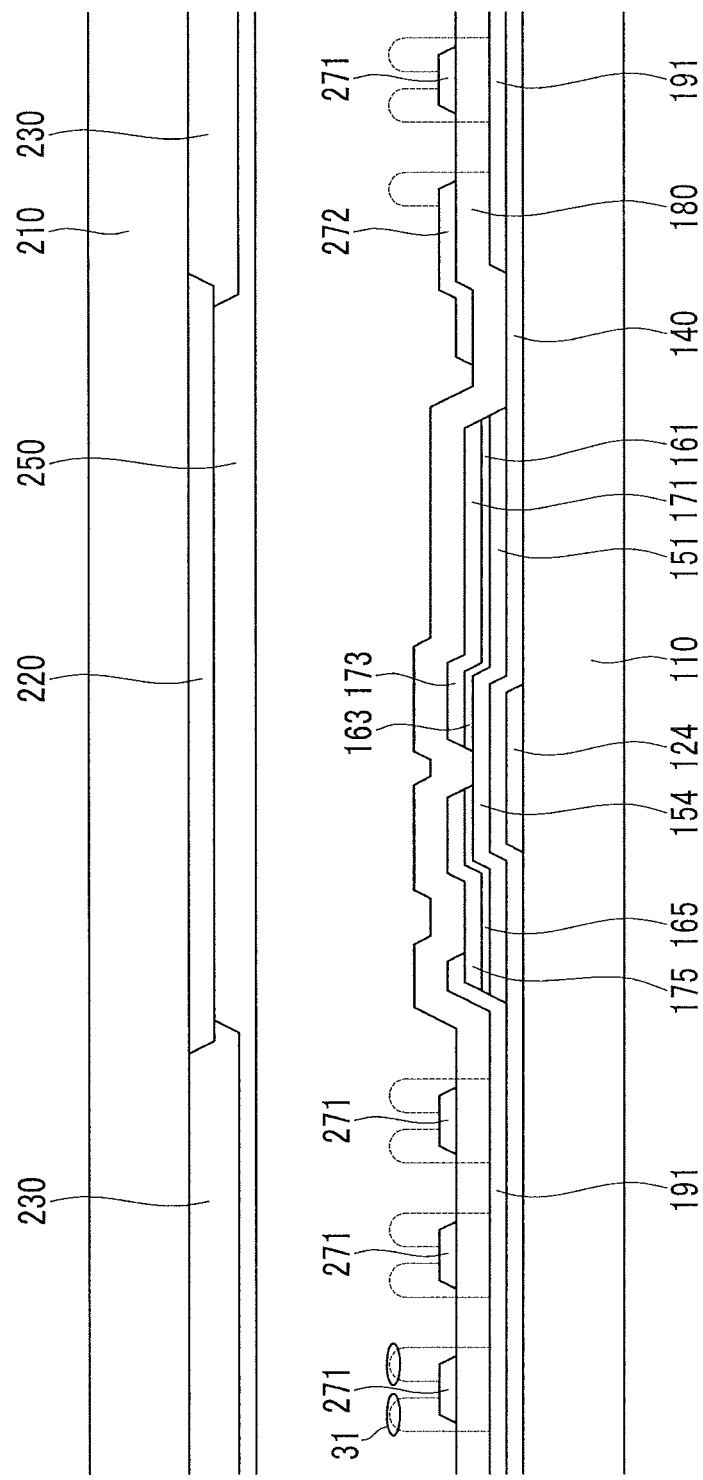
FIG. 9 is a partial cross-sectional view taken along line IX-IX of FIG. 8.
Figure 10:
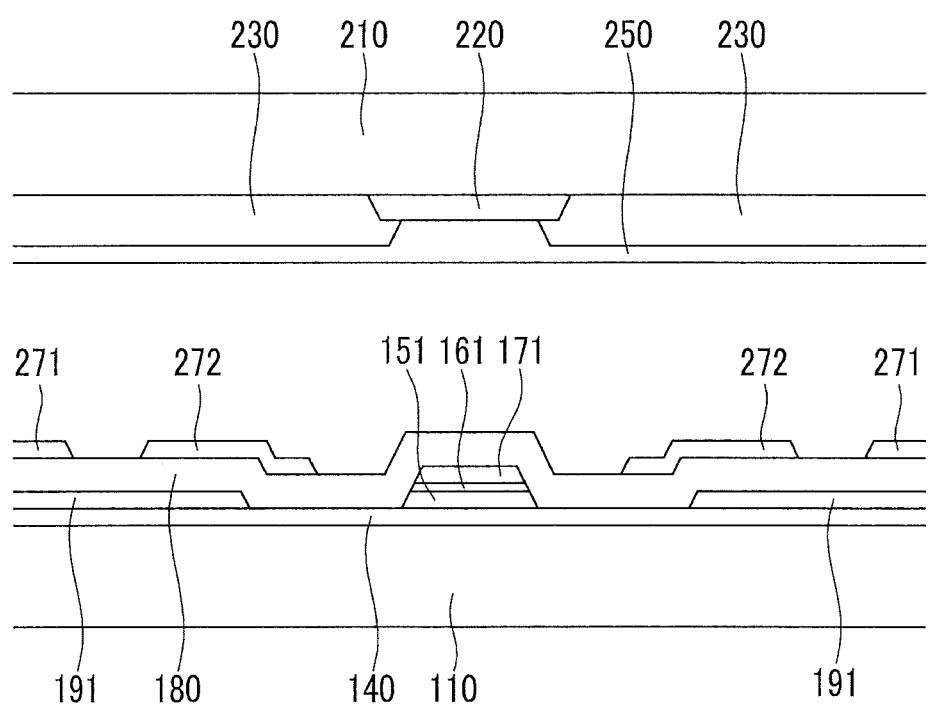
FIG. 10 is a partial cross-sectional view taken along line X-X of FIG. 8.

Referring to FIGS. 8 through 10, the liquid crystal display device includes the lower display panel 100, the upper display panel 200 disposed opposite to the lower display panel 100 and the liquid crystal layer 3 interposed therebetween.

The lower display panel 100 will now be described in further detail.

The gate line 121 and the gate conductor including the reference voltage line 131 are disposed on the insulating substrate 110, which may be made of a transparent glass or plastic, for example. The gate line 121 includes the gate electrode 124 and a wide end portion (not shown), which may be connected to other layers or external driving circuits, for example. The reference voltage line 131 transmits a predetermined reference voltage and includes the expanded portion 135 connected to the reference electrode 270. The reference voltage line 131 is connected to the reference electrode 270 and transmits the common voltage to the reference electrode 270. The reference voltage line 131 may be disposed substantially parallel to the gate line 121 and may be made of a material same as the material of which the gate line 121 may be made of.

The gate insulating layer 140 may be made SiNx or SiOx, for example, and is disposed on the gate conductors, e.g., the gate line 121 and the reference voltage line 131. The gate insulating layer 140 may have the multilayer structure including at least two insulating layers of different physical properties.

Semiconductor stripes 151, which may be made of hydrogenated a-Si p-Si, for example, are disposed on the gate insulating layer 140. The semiconductor stripe 151 extends in a direction substantially parallel to the data line 171 and includes a plurality of projection parts 154 extending toward the gate electrode 124.

Stripe ohmic contacts 161 and island ohmic contacts 165 are disposed on the semiconductor stripe 151. The ohmic contacts 161 and 165 may be made of materials such as n+ hydrogenated a-Si doped with an n-type impurity, e.g., phosphorous (P), at high concentration or may be made of silicide. The ohmic contacts 161 include a projection part 163, and the projection part 163 and the ohmic contacts 165 are disposed in pairs on the projection part 154 of the semiconductor stripe 151.

The data line 171 and the drain electrode 175 are disposed on the ohmic contacts, e.g., stripe ohmic contacts 161 and island ohmic contacts 165, and the gate insulating layer 140.

The data line 171 transmits the data signal and extends in a direction substantially vertical to the gate line 121 and the reference voltage line 131, and thereby intersects the gate line 121 and the reference voltage line 131.

The data line 171 includes the source electrode 173 extending to the gate electrode 124 and a wide end portion (not shown), which may be connected to other layers or the external driving circuits.

In an exemplary embodiment, the data line 171 may include an extended portion disposed adjacent to the gate line 121 and the reference voltage line 131 to prevent short-circuit.

The drain electrode 175 is disposed at a distance from the data line 171 and opposite to the source electrode 173, and the gate electrode 124 is disposed adjacent to the drain electrode 175 and the data line 171.

The drain electrode 175 includes a narrow part and an expanded part. A portion of the narrow part is surrounded by the source electrode 173.

The gate electrode 124, the source electrode 173 and the drain electrode 175 forms TFT along with the projection part 154 of the semiconductor stripe 151, and a channel of the thin film transistor is formed on the semiconductor island 154 between the source electrode 173 and the drain electrode 175.

The pixel electrode 191 is disposed on the expanded part of the drain electrode 175 and the gate insulating layer 140.

The pixel electrode 191 has an edge substantially parallel to the data line 171 or the gate line 121 and has a substantially rectangular (which may be a square) shape.

The pixel electrode 191 overlaps the expanded part of the drain electrode 175, and is thereby connected to the drain electrode 175 disposed thereon.

The pixel electrode 191 may be made of transparent materials such as polycrystalline, single crystalline amorphous ITO or IZO, for example.

The passivation layer 180 is disposed on the data conductors, e.g., the data line 171 and the drain electrode 175, the exposed semiconductor island 154 and the pixel electrode 191. The passivation layer 180 is made of an inorganic insulator such as silicon nitride or silicon oxide, for example. In an exemplary embodiment, the passivation layer 180 may be made of an organic insulator, and the surface of the passivation layer 180 may be planarized. The organic insulator may have photosensitivity and the dielectric constant of the organic insulator may be less than about 4.0. In an exemplary embodiment, the passivation layer 180 may have a double-layer structure, including a lower inorganic layer and an upper organic layer, which has substantially improved insulating characteristic of the organic layer effectively protect the exposed part of the semiconductor island 154.

The passivation layer 180 includes a contact hole (not shown) formed therein that exposes an end portion of the data line 171, and the passivation layer 180 and the gate insulating layer 140 include a contact hole 183 that exposes the expanded portion 135 of the reference voltage line 131, and a contact hole (not shown) that exposes an end portion of the gate line 121.

The reference electrode 270 is disposed on the passivation layer 180. The reference electrode 270 overlaps the pixel electrode 191 and includes the first connection part 272 connected to the plurality of branch electrodes 271, the second connection part 273 and reference electrodes 270 of adjacent pixels. The reference electrode 270 may be made of transparent conductive materials, such as polycrystalline, single crystalline, amorphous ITO or IZO, for example.

The branch electrode 271s of the reference electrode 270 may be disposed in a direction forming an angle in a range of about 5° through about 20° with the gate line 121. In an exemplary embodiment, the branch electrode 271 of the reference electrode 270 may be disposed in a direction forming an angle of about 10° with the rubbing direction of the alignment layer.

The branch electrode 271 of the reference electrode 270 includes the first part 271a (shown in the dotted circle indicating portion A of FIG. 8) extending in a predetermined direction and the second part 271b (shown in the dotted circle indicating portion A' of FIG. 8) extending from of the first part 271a disposed adjacent to the first connection part 272.

The first part 271a of the branch electrode 271 of the reference electrode 270 forms an angle in a range of about 7° through about 13°, e.g., about 10°, with the rubbing direction of the alignment layer and the second part 271b may be disposed in a direction forming an angle in a range of about 7° through about 15° with the first part 271a.

Figure 11A:
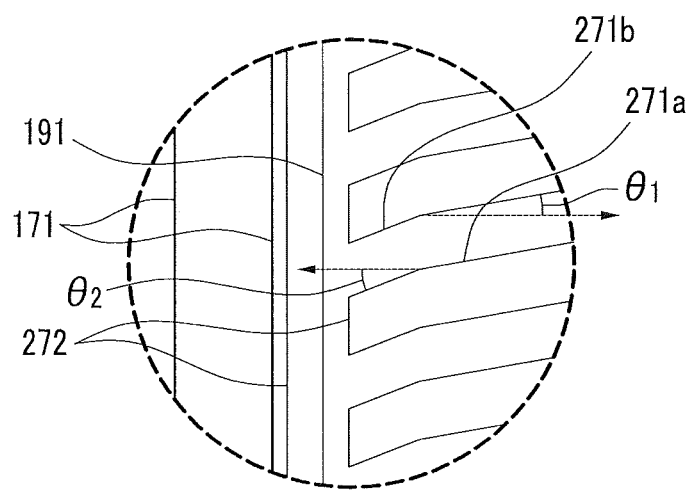
FIG. 11A is an enlarged view of portion A of FIG. 8.

The first part 271a and the second part 271b of the branch electrodes 271 will now be described in greater detail with reference to FIGS. 11A and 11B. FIG. 11A is an enlarged view of portion A of FIG. 8, which is the first part 271a of the reference electrode, and FIG. 11B is an enlarged view of portion A' of FIG. 8, which is the second part 271b of the reference electrode.

Figure 11B:
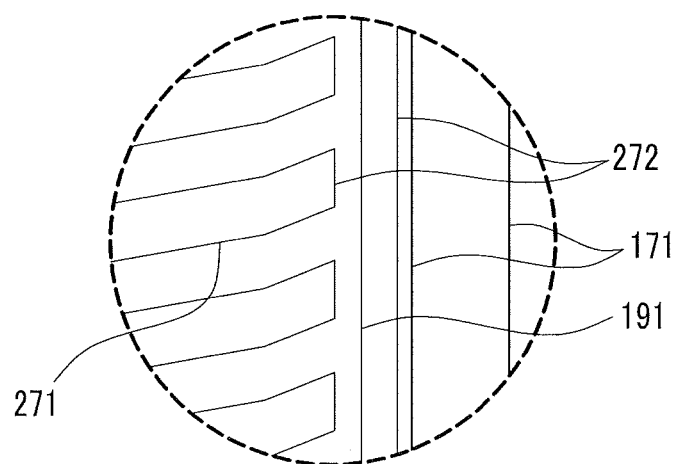
FIG. 11B is an enlarged view of portion A' of FIG. 8.

Referring now to FIGS. 11A and 11B, the first part 271a of the branch electrode 271 of the reference electrode 270 is disposed in a direction forming a first angle 81 with the rubbing direction of the alignment layer disposed on the lower display panel 100. As described above, the first angle 81 may be in a range of about 7° through about 13°, e.g., about 10°. In addition, the second part 271b of the branch electrode 271 of the reference electrode 270 extends from the first part 271a forming a second angle 82 with the first part 271a. The second angle 82 may be in a range of about 7° through about 15°

As described above, the branch electrode 271 of the reference electrode 270 includes the first part 271a and the second part 271b, and the directions of the electric filed generated at the central part and at edge part of the pixel area are thereby changed. In a conventional liquid crystal display device, the diction of the electric filed at the edge part of the branch electrode 271 is different from the direction of the electric field at the central part of the branch electrode 271, and when the electric field is generated in the liquid crystal layer 3, the aligned directions of the liquid crystal molecules are irregular, and a texture is thereby generated. In an exemplary embodiment, however, the reference electrode includes the second part 271b extending from an end portion of the first part 271a forming an angle with the first part 271a to change the directions of the electric field generated in the liquid crystal layer 3, and the liquid crystal molecules in the liquid crystal layer 3 are thereby rotated in a predetermined direction and the rotation direction of the liquid crystal molecules is thereby determined when the liquid crystal molecule 31 rotates. Accordingly, texture due to any irregular rotation of the liquid crystal molecule 31 at the left and right boundary area of the pixel area is thereby effectively prevented. In an exemplary embodiment, the branch electrode 271 of the reference electrode 270 includes the first part 271a and the second part 271b to differently set the rotation angle of the liquid crystal molecule 31, and the viewing angle of the liquid crystal display device is thereby substantially increased and the color tone is effectively compensated.

Referring again to FIGS. 8 and 10, the reference electrodes 270 disposed in pixels disposed adjacent to each other are connected to each other by the second connection part 273, and the second connection part 273 overlaps a portion of the data line 171. The length of the portion of the data line 171 that overlaps the second connection part 273 is substantially less than the entire length of the data line 171 disposed in one pixel area.

The reference electrode 270 is connected to the reference voltage line 131 through the contact hole 183 formed on the passivation layer 180 and the gate insulating layer 140.

In an exemplary embodiment, the alignment layer (not shown) is disposed on the reference electrode 270 and the passivation layer 180, and the alignment layer may be a horizontal alignment layer and rubbed in a predetermined direction. The rubbing direction of the alignment layer may form an angle of about 10° with a direction in which the first part 271a of the branch electrode of the reference electrode 270 extends.

The upper display panel 200 now will now be described in further detail.

The light blocking member 220 is disposed on the insulating substrate 210, which may be made of transparent glass or plastic, for example. The light blocking member 220, also referred to as a black matrix, prevents light leakage.

Color filters 230 are disposed on the insulating substrate 210. The color filters 230 may be disposed overlapping an area surrounded by the light blocking member 220 and extending along a substantially vertical direction along a column of the pixel electrode 191. Each of the color filters 230 may display one primary color of three primary colors (e.g., one of red, green and blue).

The overcoat 250 is disposed on the color filters 230 and the light blocking member 220. The overcoat 250 may be made of an insulating material, e.g., an organic insulating material, and prevents exposure of the color filters 230 and provides the planarized plane. In one or more exemplary embodiments, the overcoat 250 may be omitted.

The liquid crystal layer 3 includes a nematic liquid crystal material having positive dielectric anisotropy. The liquid crystal molecules of the liquid crystal layer 3 have a structure in which the direction of the longitudinal axis is arranged parallel to a plane defined by parallel surfaces of the lower display panel 100 and the upper display panel 200 and twisted spirally by 90° from the rubbing direction of the alignment layer of the lower display panel 100 to the upper display panel 200.

The pixel electrode 191 receives a data voltage from the drain electrode 175, and the reference electrode 270 receives a predetermined reference voltage from the reference voltage line 131.

The pixel electrode 191 that receives the data voltage and the reference voltage line 131 that receives the common voltage generate an electric field, and the liquid crystal molecules of the liquid crystal layer 3 disposed above the pixel electrode 191 and the reference electrode 270 rotate in a direction parallel to the direction of the electric field. As described above, polarization of light that transmits the liquid crystal layer is changed according to the rotation direction of the liquid crystal molecules when the electric filed is generated therein.

As described above, the liquid crystal molecules 31 of the liquid crystal layer 3 of the liquid crystal display device rotate corresponding to an electric field generated between the edge of the branch electrode 271 of the reference electrode 270 and the pixel electrode 191. In an exemplary embodiment, since the alignment layer is rubbed such that the liquid crystal molecule 31 is pre-titled at a predetermined angle and the rubbing angle forms about 7° with the branch electrode 271 of the reference electrode 270, the liquid crystal molecule 31 is thereby rotated rapidly in a pre-tilted direction.

In an exemplary embodiment, the pixel electrode 191 of the liquid crystal display device is disposed between the gate insulating layer 140 and the passivation layer 180 and overlaps a portion of the drain electrode 175 to be connected to the drain electrode 175. Accordingly, the aperture ratio may be greater than the aperture ratio of a conventional liquid crystal display device in which a pixel electrode and a drain electrode are connected through a contact hole.

In an exemplary embodiment, the first connection part 272 connected to the branch electrodes 271 of the reference electrode 270 is disposed parallel to the data line 171, and the aperture ratio of the liquid crystal display device is thereby increased while the parasitic capacitance between the pixel electrode 191 and the data line 171 is substantially reduced.

Relationships between the data line 171, the reference electrode 270 and the pixel electrode 191 according to one or more exemplary embodiments will now be described in greater detail with reference to FIG. 10.

As shown in FIG. 10, the liquid crystal display device includes the pixel electrode 191 and the data line 171 disposed on the gate insulating layer 140 with a first interval therebetween, the passivation layer 180 disposed on the data line 171 and the pixel electrode 191 and the branch electrode 271 including the branch electrode 271 and the horizontal/first connection part 272 of the branch electrode 271 and disposed on the passivation layer 180 with a second interval from the data line 171.

In an exemplary embodiment, the first interval between the pixel electrode 191 and the data line 171 is greater than the second interval between the reference electrode 270 and the data line 171.

In an exemplary embodiment, the liquid crystal display device includes the reference electrode 270 disposed on the passivation layer 180 and including the branch electrode 271 and the connection part 272 connected to the branch electrode 271 is disposed on the passivation layer 180 such that a portion of the connection part 272 overlaps the first interval between the pixel electrode 191 and the data line 171.

In an exemplary embodiment, the overlapped portion of the first interval between the pixel electrode 191 and the data line 171 and the connection part 272 is disposed adjacent to the data line 171 where the image is not displayed.

Accordingly, the parasitic capacitances between the data line 171 and the reference electrode 270 or the parasitic capacitances between the data line 171 and the pixel electrode 191 is substantially reduced while the aperture ratio of the liquid crystal display device is significantly increased.

Figure 12:
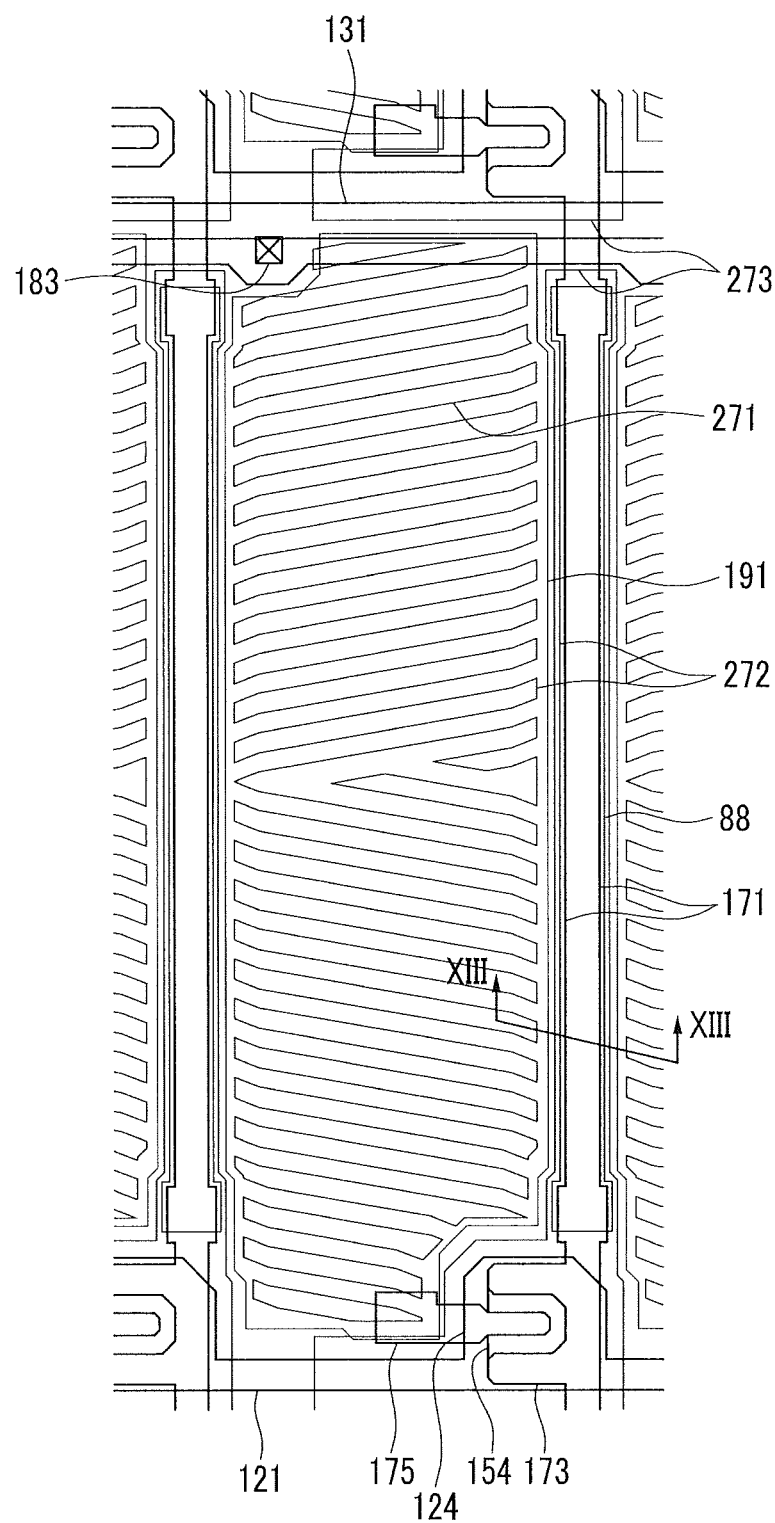
FIG. 12 is a plan view of yet another exemplary embodiment of a liquid crystal display device according to the present invention.

Another exemplary embodiment of a liquid crystal display device will now be described in further detail with reference to FIGS. 12 and 13. FIG. 12 is a plan view of an exemplary embodiment of a liquid crystal display device according to the present invention, and FIG. 13 is a partial cross-sectional view taken along line XIII-XIII of FIG. 12.

Figure 13:
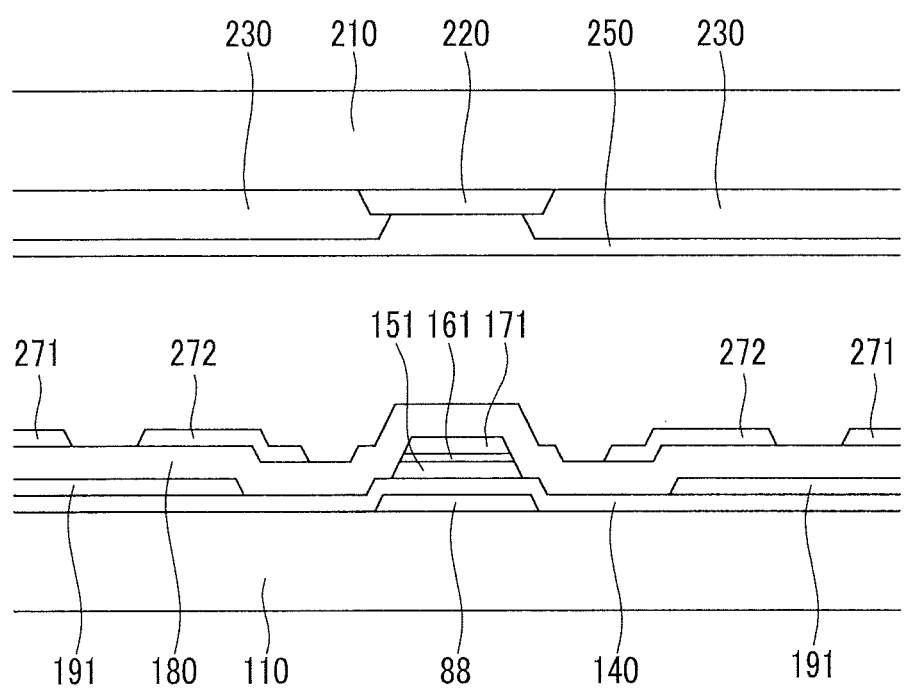
FIG. 13 is a partial cross-sectional view taken along line XIII-XIII of FIG. 12.

The exemplary embodiment of the liquid crystal display device shown in FIGS. 12 and 13 is substantially the same as the exemplary embodiments of the liquid crystal display device shown in FIGS. 8 through 10 except for a shielding electrode 88. The same or like elements shown in FIGS. 12 and 13 have been labeled with the same reference characters as used above to describe the exemplary embodiments of the liquid crystal display device shown in FIGS. 8 through 10, and any repetitive detailed description thereof will hereinafter be omitted or simplified.

In an exemplary embodiment, the liquid crystal display device further includes the shielding electrode 88 disposed under the data line 171, as shown in FIGS. 12 and 13. The shielding electrode 88 may be disposed in a same layer including the gate conductor, and may be electrically floated. In an exemplary embodiment, the width of the shielding electrode 88 may be greater than the width of the data line 171 or the semiconductor stripe 151.

The shielding electrode 88 effectively prevents light from entering the semiconductor stripe 151 disposed under the data line 171, and undesired activation of the semiconductor stripe 151 by the light is thereby effectively prevented.

Another exemplary embodiment will now be described in further detail with reference to FIG. 14, which is a plan view of yet another exemplary embodiment a liquid crystal display according to the present invention.

Figure 14:
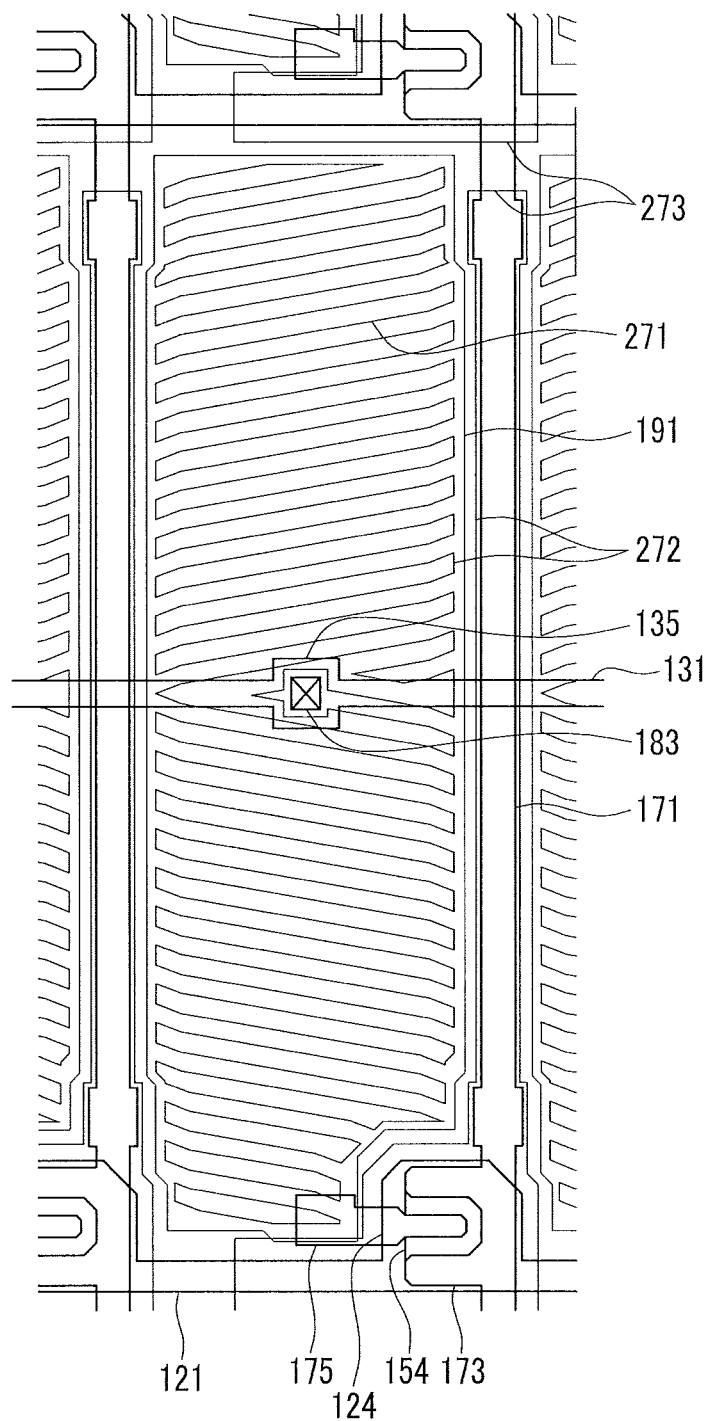
FIG. 14 is a plan view of another exemplary embodiment of a liquid crystal display device according to the present invention.

The structure of the liquid crystal display device of FIG. 14 is substantially the same as the structure the liquid crystal display device in FIGS. 8 through 10 except for the reference voltage line 131. The same or like elements shown in FIG. 14 have been labeled with the same reference characters as used above to describe the exemplary embodiments of the liquid crystal display device shown in FIGS. 8 through 10, and any repetitive detailed description thereof will hereinafter be omitted or simplified.

As shown in FIG. 14, the reference voltage line 131 is disposed at the middle of the pixel area of the liquid crystal display device. In an exemplary embodiment, the expanded portion 135 of the reference voltage line 131 is disposed at the center of the pixel area and the expanded portion of the reference electrode is disposed at the center of the pixel area.

In an exemplary embodiment, since the pixel electrode 191 of the pixel does not overlap the expanded portion 135 of the reference voltage line 131, the contact hole 183 and the expanded portion 275 of the reference electrode 270, an edge of the pixel electrode 191 adjacent to the data line 171 may have a cutout that surrounds at least a portion of the contact area of the reference voltage line 131 and the reference electrode 270. Accordingly, the pixel electrode 191 disposed between the reference voltage line 131 and the reference electrode 270 is not overlapping the contact area of the reference voltage line 131 and the reference electrode 270, and a short between the reference electrode 270 and the pixel electrode 191 is thereby effectively prevented.

Another exemplary embodiment will now be described in further detail with reference to FIG. 15, which is a plan view of another exemplary embodiment of a liquid crystal display device according to the present invention.

Figure 15:
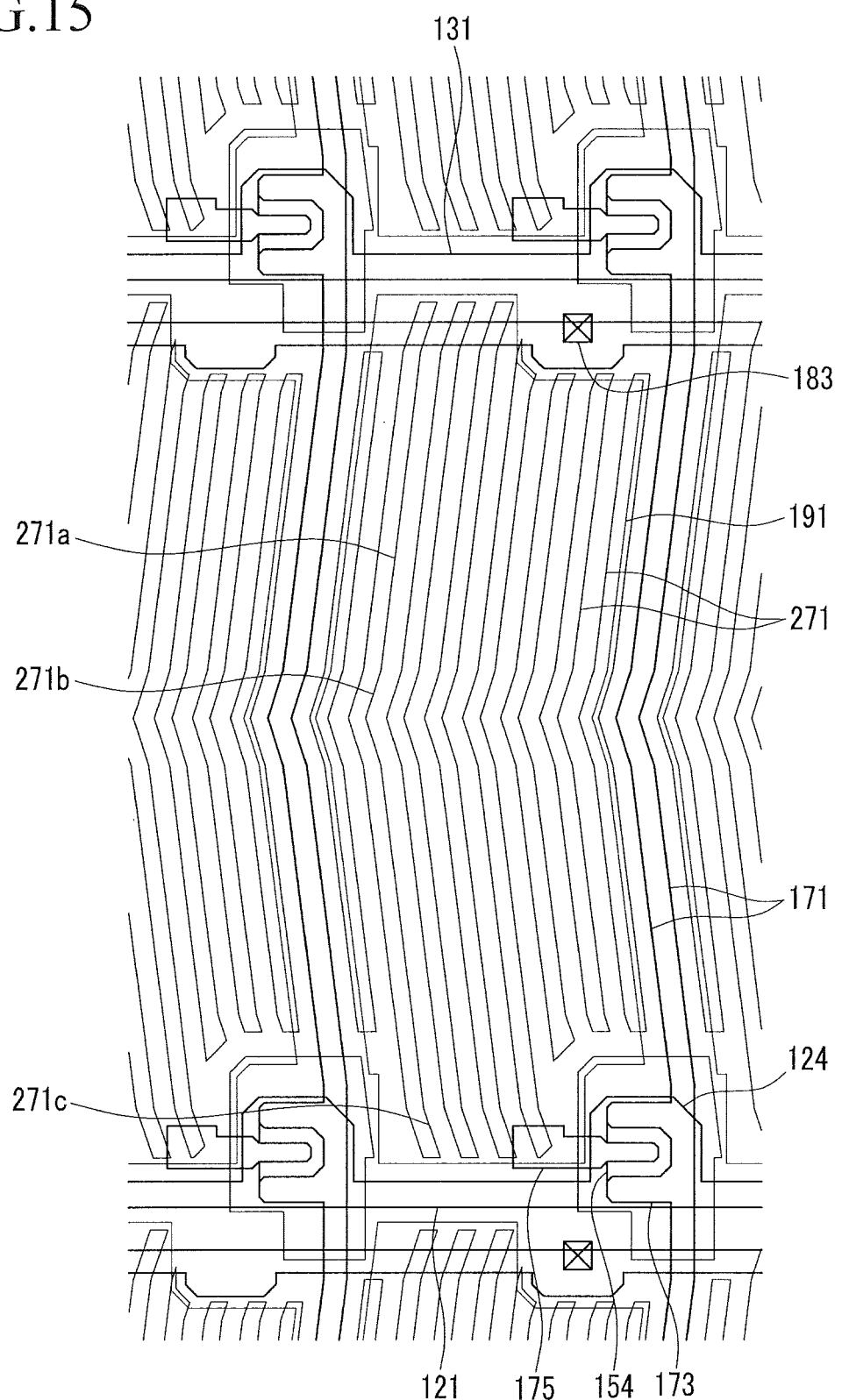
FIG. 15 is a plan view of still another exemplary embodiment of a liquid crystal display device according to the present invention.

The liquid crystal display device of FIG. 15 is substantially the same as the liquid crystal display device in FIGS. 8 through 10 except for the reference voltage line 131. The same or like elements shown in FIG. 14 have been labeled with the same reference characters as used above to describe the exemplary embodiments of the liquid crystal display device shown in FIGS. 8 through 10, and any repetitive detailed description thereof will hereinafter be omitted or simplified.

As shown in FIG. 15, the gate line 121, which includes the gate electrode 124, and the reference voltage line 131 are disposed on the insulating substrate 110, the gate insulating layer 140 is disposed on the gate line 121 and the reference voltage line 131 and the semiconductor island 154, the ohmic contacts 163 and 165 are disposed on the gate insulating layer 140, and the data line 171 and the drain electrode 175, which include the source electrode 173, are disposed on the gate insulating layer 140 and the ohmic contacts 163 and 165. The pixel electrode 191 is disposed on the gate insulating layer 140 and a portion of the drain electrode 175 and the passivation layer 180 having the contact hole 183 is disposed on the pixel electrode 191, the data line 171, the drain electrode 175 and the exposed semiconductor island 154. The reference electrode 270 including the branch electrode 271 is disposed on the passivation layer 180, overlapping the pixel electrode 191.

Referring again to FIGS. 8 through 10, in an exemplary embodiment, the data line 171 may include a first curved part having the chevron-like shape and may be disposed at an intermediate area of the pixel area to obtain maximum transmittance of the liquid crystal display device. The intermediate area of the pixel area may further include a second curved part that extends from the first curved part forming a predetermined angle with the first curved part. The first curved part of the data line 171 may form an angle in a range of about 5° through about 10°, e.g., about 7°, with a rubbing direction of an alignment layer. The second curved part may be disposed adjacent to the intermediate area of the pixel area forming an angle in a range of about 7° through about 15° with the first curved part.

Further, the branch electrode 271 of the reference electrode 270 includes a first part 271a (shown in portion A) substantially parallel to the first curved part of the data line 171 and a second part 271b (shown in portion A') substantially parallel to the second curved part of the data line 171. The first part 271a may form an angle of about 7° with the rubbing direction of the alignment layer and the second part 271b may form an angle in a range of about 7° through about 15° with the first part 271a.

Figure 16:
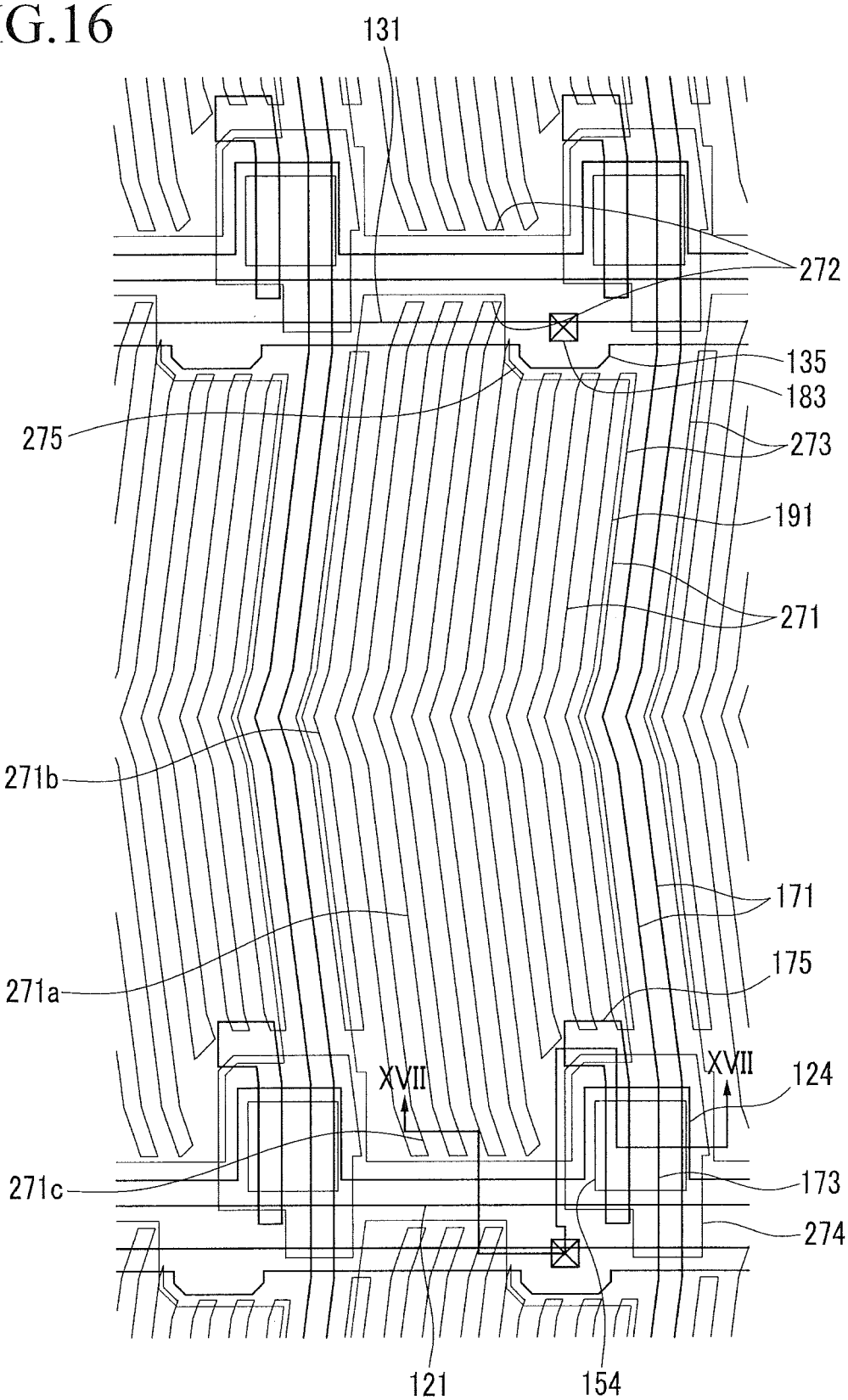
FIG. 16 is a plan view of yet another exemplary embodiment of a liquid crystal display device according to the present invention.

Another exemplary embodiment will now be described in further detail with reference to FIGS. 16 and 17. FIG. 16 is a plan view of still another exemplary embodiment of a liquid crystal display device according to the present invention, and FIG. 17 is a partial cross-sectional view taken along line XVII-XVII of FIG. 16.

Figure 17:
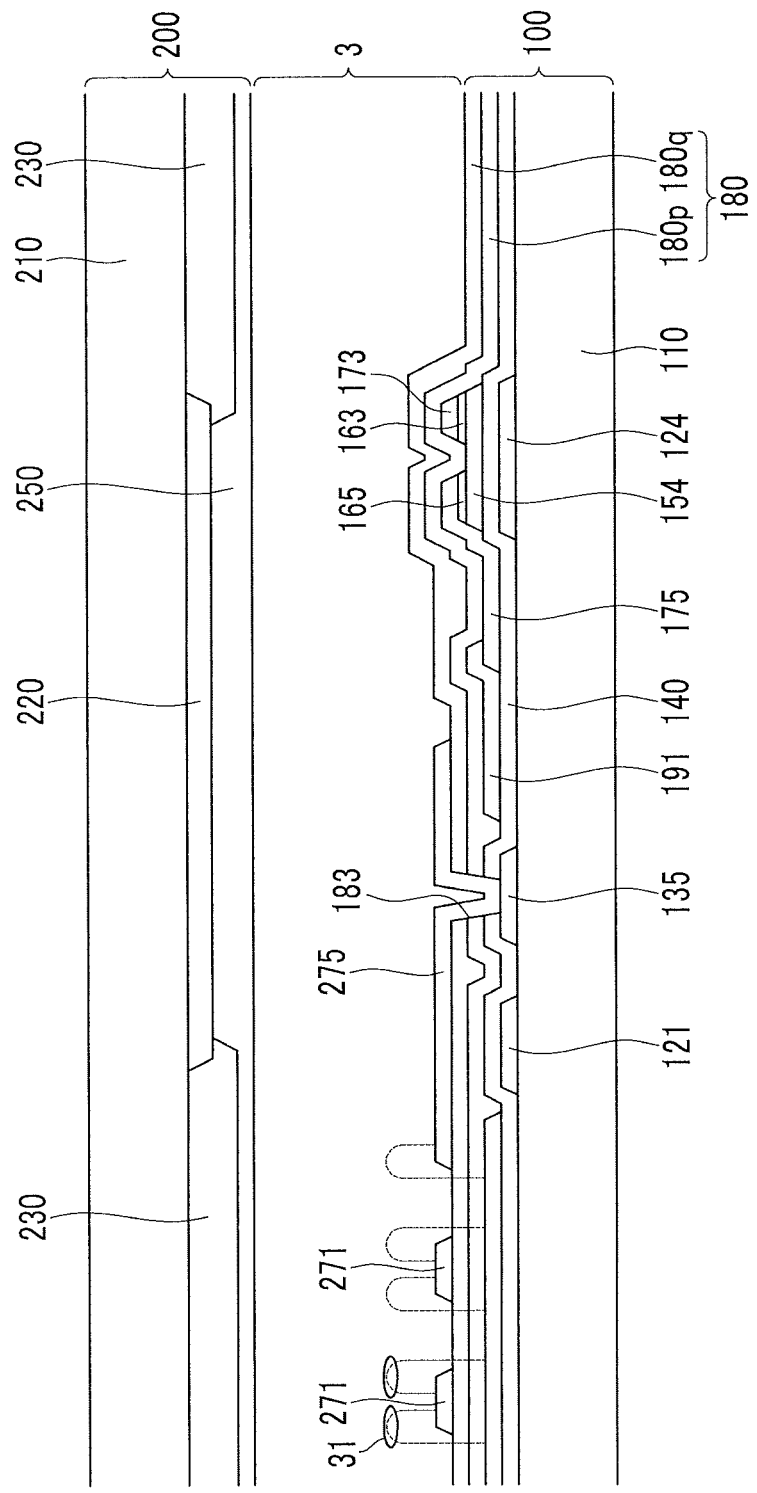
FIG. 17 is a partial cross-sectional view taken along line XVII-XVII of FIG. 16.

The liquid crystal display device shown in FIGS. 16 and 17 is substantially the same as the liquid crystal display device in FIGS. 1, 2A and 2B except for the passivation layer 180. The same or like elements shown in FIGS. 16 and 17 have been labeled with the same reference characters as used above to describe the exemplary embodiments of the liquid crystal display device shown in FIGS. 1, 2A and 2B, and any repetitive detailed description thereof will hereinafter be omitted or simplified.

As shown in FIGS. 16 and 17, the gate line 121, which includes the gate electrode 124, and the reference voltage line 131 are disposed on the insulating substrate 110, the gate insulating layer 140 is disposed on the gate line 121 and the reference voltage line 131, the semiconductor island 154 and the ohmic contacts 163 and 165 are disposed on the gate insulating layer 140, and the data line 171 and the drain electrode 175, which include the source electrode 173, are disposed on the gate insulating layer 140 and the ohmic contacts 163 and 165. The pixel electrode 191 is disposed on the gate insulating layer 140 and a portion of the drain electrode 175. The thickness of the pixel electrode 191 may be in a range of about 400 Å through about 500 Å. The passivation layer 180 having the contact hole 183 is disposed on the pixel electrode 191, the data line 171, the drain electrode 175 and the exposed semiconductor island 154. The reference electrode 270 including the branch electrode 271 is disposed on the passivation layer 180, overlapping the pixel electrode 191.

As shown in FIG. 17, the liquid crystal display device includes the passivation layer 180 having a dual-layer structure including a first passivation layer 180p and a second passivation layer 180q.

The first passivation layer 180p and the second passivation layer 180q may have different refractive indexes. Specifically, the refractive index of the first passivation layer 180p may be in a range of about 1.4 through about 1.6, and the refractive index of the second passivation layer 180q may be in a range of about 1.6 through about 2.2. The first passivation layer 180p and the second passivation layer 180q may be made of inorganic insulator, e.g., SiNx or SiOx. In an exemplary embodiment, the first passivation layer 180p and the second passivation layer 180q may be made of a same inorganic material, or may be made of a different inorganic material. In an exemplary embodiment, the thickness of the passivation layer 180 may be in a range of about 5500 Å through about 6500 Å, while the thickness of the first passivation layer 180p and the second passivation layer 180q of the passivation layer 180 may be in a range of about 2800 Å through about 3200 Å.

The refractive index of the first passivation layer 180p and the second passivation layer 180q are controlled by adjusting a pressure and flow rate of nitrogen ($N_2$) gas used in an exemplary embodiment of a chemical vapor deposition ("CVD") process, which is a process of depositing the first passivation layer 180p and the second passivation layer 180q.

Figure 18:
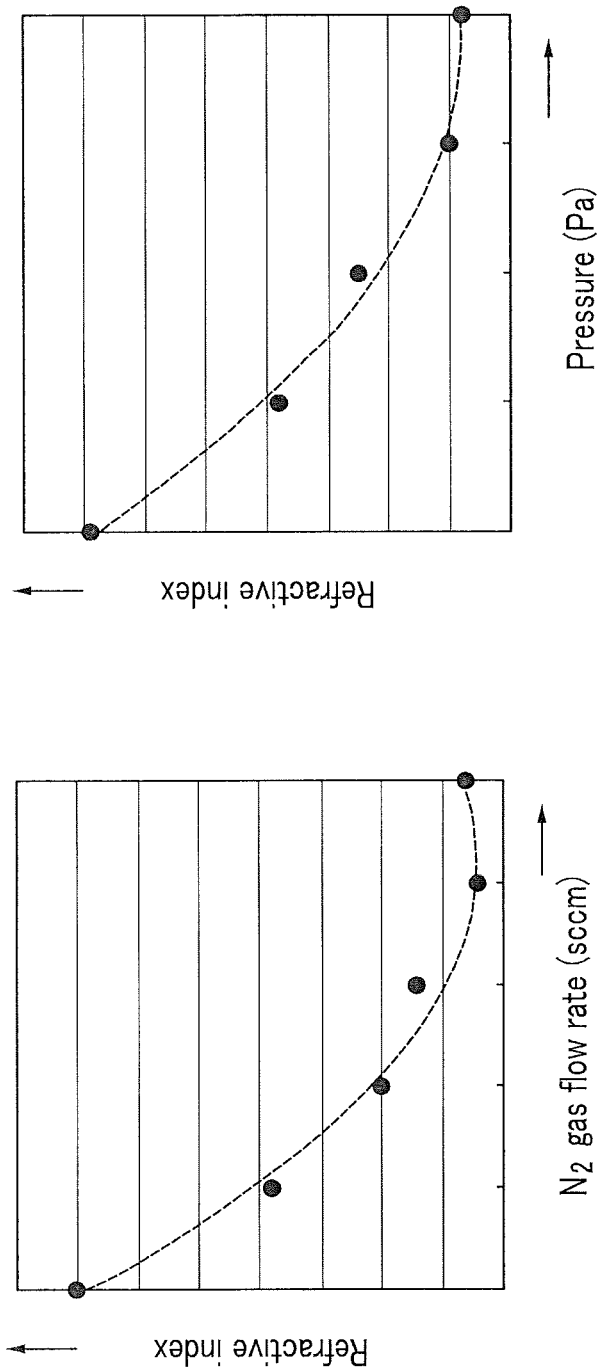
FIG. 18 includes graphs of refractive index versus both flow rate of nitrogen ($N_2$) gas and pressure of $N_2$ gas used in an exemplary embodiment of a chemical vapor deposition process according to the present invention.

FIG. 18 includes graphs of refractive index versus flow rate of $N_2$ gas, in standard cubic centimeter per minute (sccm), and of refractive index versus pressure of $N_2$ gas, in Pascal (Pa), used in an exemplary embodiment of a chemical vapor deposition process according to the present invention. As shown in FIG. 18, the refractive index of the first passivation layer 180p or the second passivation layer 180q is determined by adjusting the pressure and flow rate of the $N_2$ gas. In an exemplary embodiment, the first passivation layer 180p and the second passivation layer 1801 of the liquid crystal display device have different nitrogen contents, and, more particularly, the nitrogen content of the first passivation layer 180p may be greater than the nitrogen content of the second passivation layer 180q.

Figure 19:
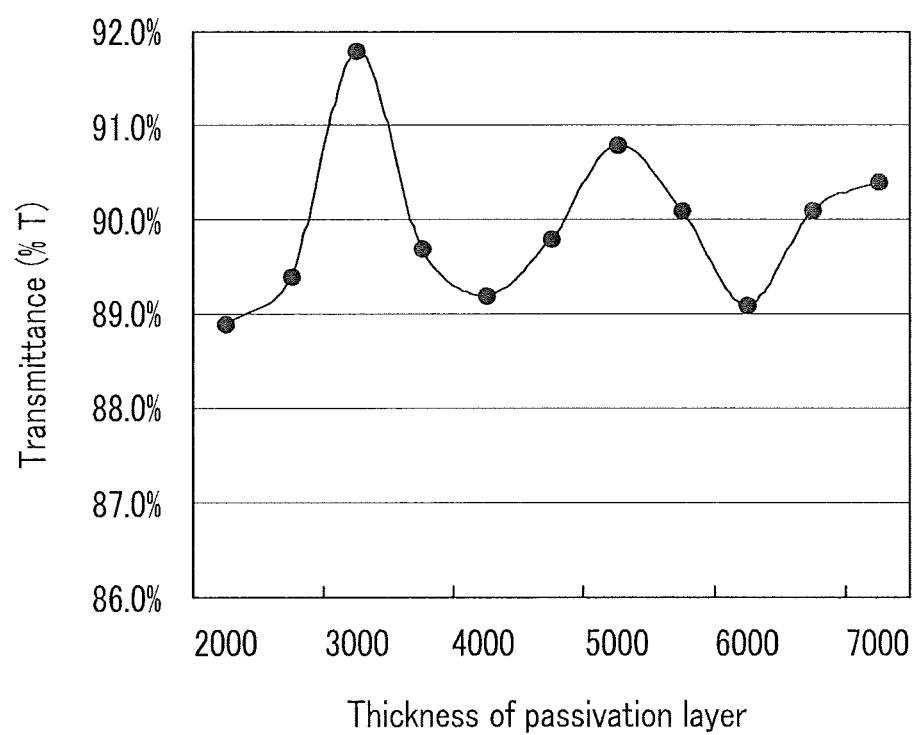
FIG. 19 is a graph of transmittance versus thickness of an exemplary embodiment of a passivation layer in a liquid crystal display device according to the present invention.
Figure 20:
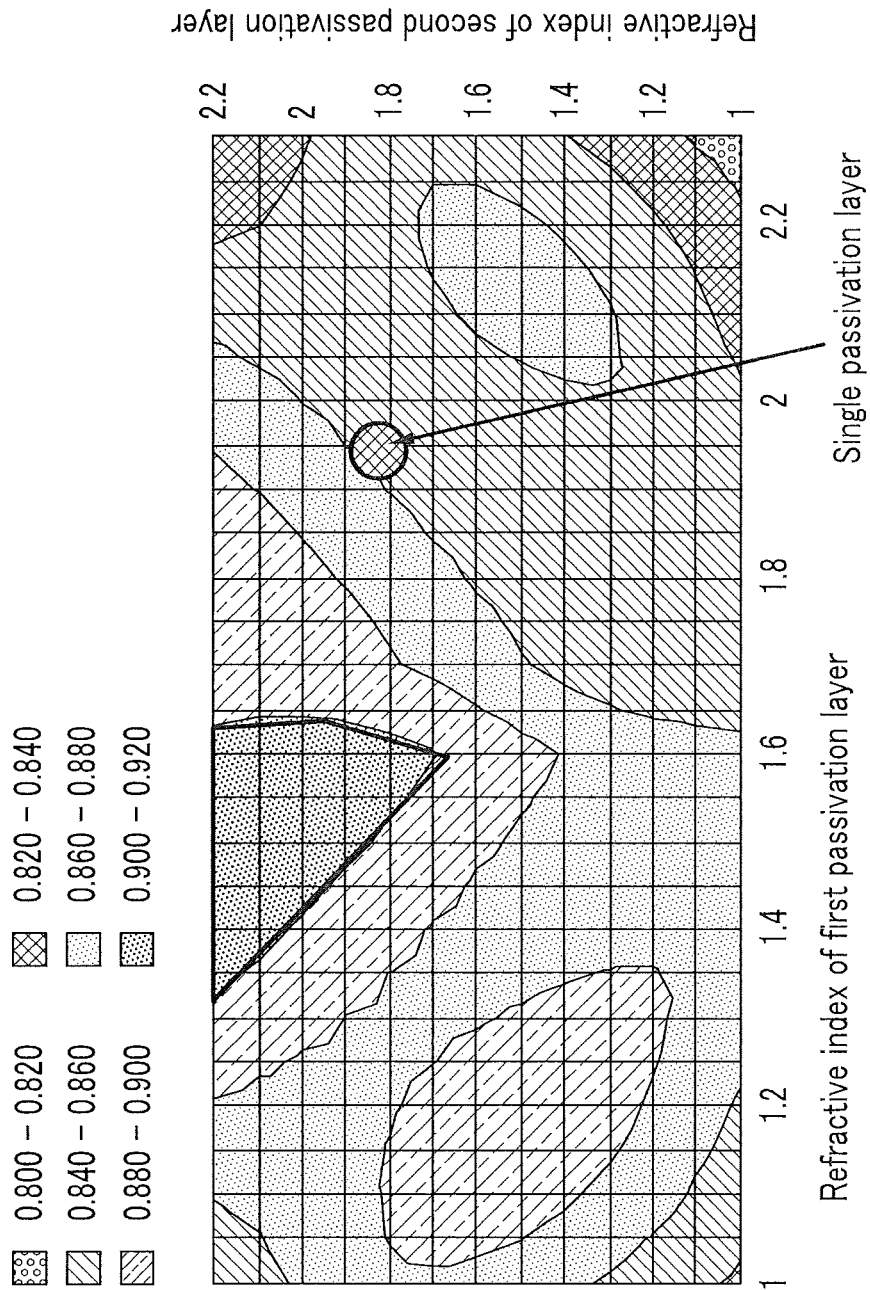
FIG. 20 is a graph of transmittance of an exemplary embodiment of a liquid crystal display device corresponding to refractive indexes of a first and a second passivation layer thereof according to the present invention.

As described above, by controlling the nitrogen content of both the first passivation layer 180p and the second passivation layer 180q, the refractive indexes of the first passivation layer 180p and the second passivation layer 180q may be predetermined, and transmittance deterioration, due to a haze phenomenon from crystallization of the pixel electrode 191 or reference electrode 270 made of a transparent material, is thereby reduced and/or is effectively prevented in an exemplary embodiment of a manufacturing process of the liquid crystal display device according to the present invention, as will now be described in further detail with reference to FIGS. 19 and 20.

FIG. 19 is a graph of percent transmittance (% T) of an exemplary embodiment of a liquid crystal display device versus thickness of a passivation layer 180 thereof, in angstroms (Å), and FIG. 20 is a graph of transmittance of the liquid crystal display device corresponding to refractive indexes of the first passivation layer 180p and the second passivation layer 180q.

As shown in FIG. 19, as the thickness of the passivation layer 180 changes, the transmittance of liquid crystal display device changes. When the thickness of the passivation layer 180 is in a range of about 2800 Å through about 3200 Å or in a range of about 5500 Å through about 6500 Å, the transmittance of the liquid crystal display device is substantially improved relative to other thickness ranges. Accordingly, the transmittance of the liquid crystal display device is substantially improved when the thickness of the passivation layer 180 is in a range of about 5500 Å through about 6500 Å.

Referring to FIG. 20, the transmittance of the liquid crystal display device also changes in accordance with the refractive indexes of the first passivation layer 180p and the second passivation layer 180q of the passivation layer 180. The transmittance of the liquid crystal display device is about 0.820 through about 0.840 when the passivation layer 180 is formed to have a single layer. As shown in FIG. 20, however, in an exemplary embodiment in which the passivation layer 180 is formed in a dual-layer structure including the first passivation layer 180p having refractive index in a range of about 1.4 through about 1.6 and the second passivation layer 180q having refractive index in a range of about 1.6 through about 2.2, the transmittance of the liquid crystal display device is substantially increased to a range of about 0.900 through about 0.920.

Changes in transmittance of a liquid crystal display device now will now be described in further detail with reference to an experimental example. In the experimental example, the haze phenomenon was measured when the passivation layer 180 is formed in a single layer (Case A) and when the passivation layer 180 has a dual-layer structure including the first passivation layer 180p and the second passivation layer 180q having different refractive index (Case B).

The following Table 2 shows the condition of chemical vapor deposition process of the first passivation layer and the second passivation layer used in the experimental example and the result of haze phenomenon.

TABLE 2

| | First passivation layer | | Second passivation layer | | |
| --- | --- | --- | --- | --- | --- |
| | Thickness | Refractive index | Thickness | Refractive index | Haze phenomenon |
| Case A | 6000 Å | 1.9 | — | — | High |
| Case B | 2800 Å-3200 Å | 1.4-1.6 | 2800 Å-3200 Å | 1.6-2.2 | Low |

Figure 21A:
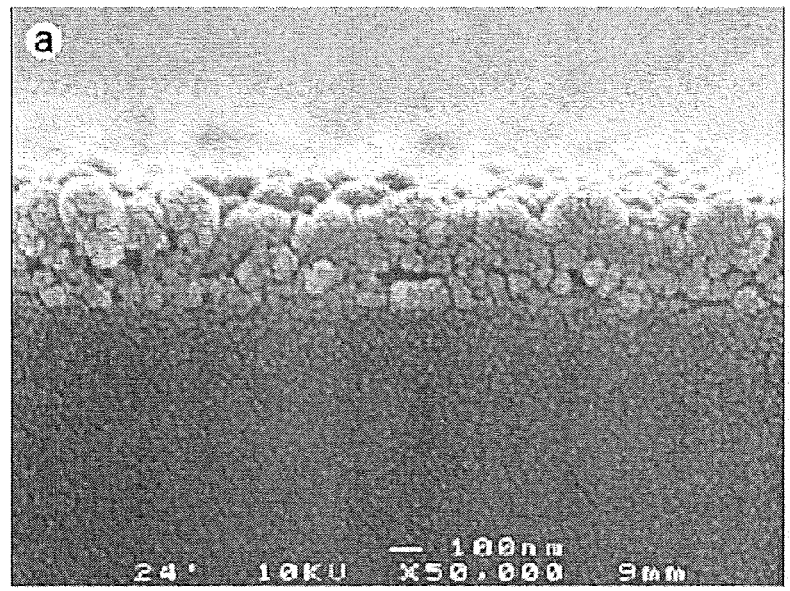
FIGS. 21A and 21B are microphotographs of a cross section of an exemplary embodiment of a transparent electrode according to the present invention.
Figure 21B:
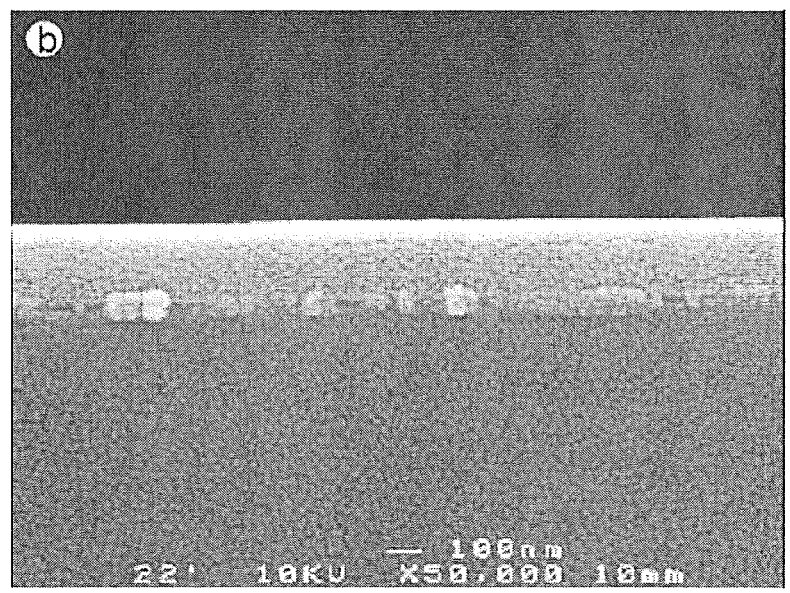

FIGS. 21A and 21B are microphotographs showing cross sections of a transparent electrode, which includes indium (In), when the passivation layer 180 is formed as a single layer and when the passivation layer 180 has a dual-layer structure including the first passivation layer 180p and the second passivation layer 180q having different refractive indexes, according to an exemplary embodiment of the present invention.

Referring to FIGS. 21A and 21B and Table 2, as compared to the passivation layer 180 formed in a single layer, the haze phenomenon is substantially improved, e.g., is effectively prevented, in an exemplary embodiment in which the passivation layer 180 has the dual-layer structure including the first passivation layer 180p and the second passivation layer 180q having different refractive index. Accordingly, in an exemplary embodiment, the reduction of transmittance of the pixel electrode 191 and the reference electrode 270 by the haze phenomenon is substantially reduced and/or is effectively prevented.

Figure 22:
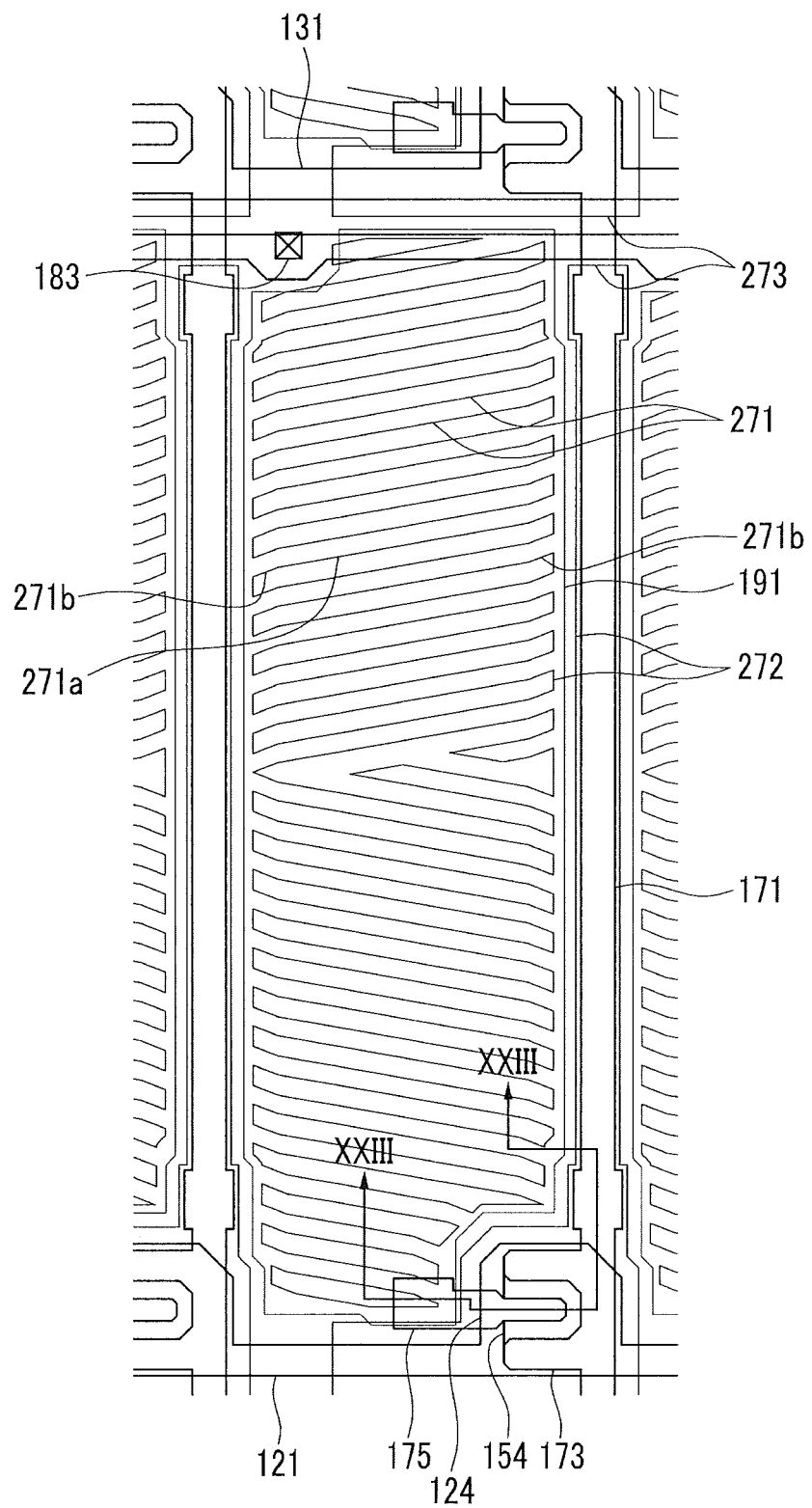
FIG. 22 is a plan view of another exemplary embodiment of a liquid crystal display device according to the present invention.

Another exemplary embodiment of a liquid crystal display device will now be described in further detail with reference to FIGS. 22 and 23. FIG. 22 is a plan view of another exemplary embodiment of a liquid crystal display device according to the present invention, and FIG. 23 is a partial cross-sectional view taken along line XXIII-XXIII of FIG. 22.

Figure 23:
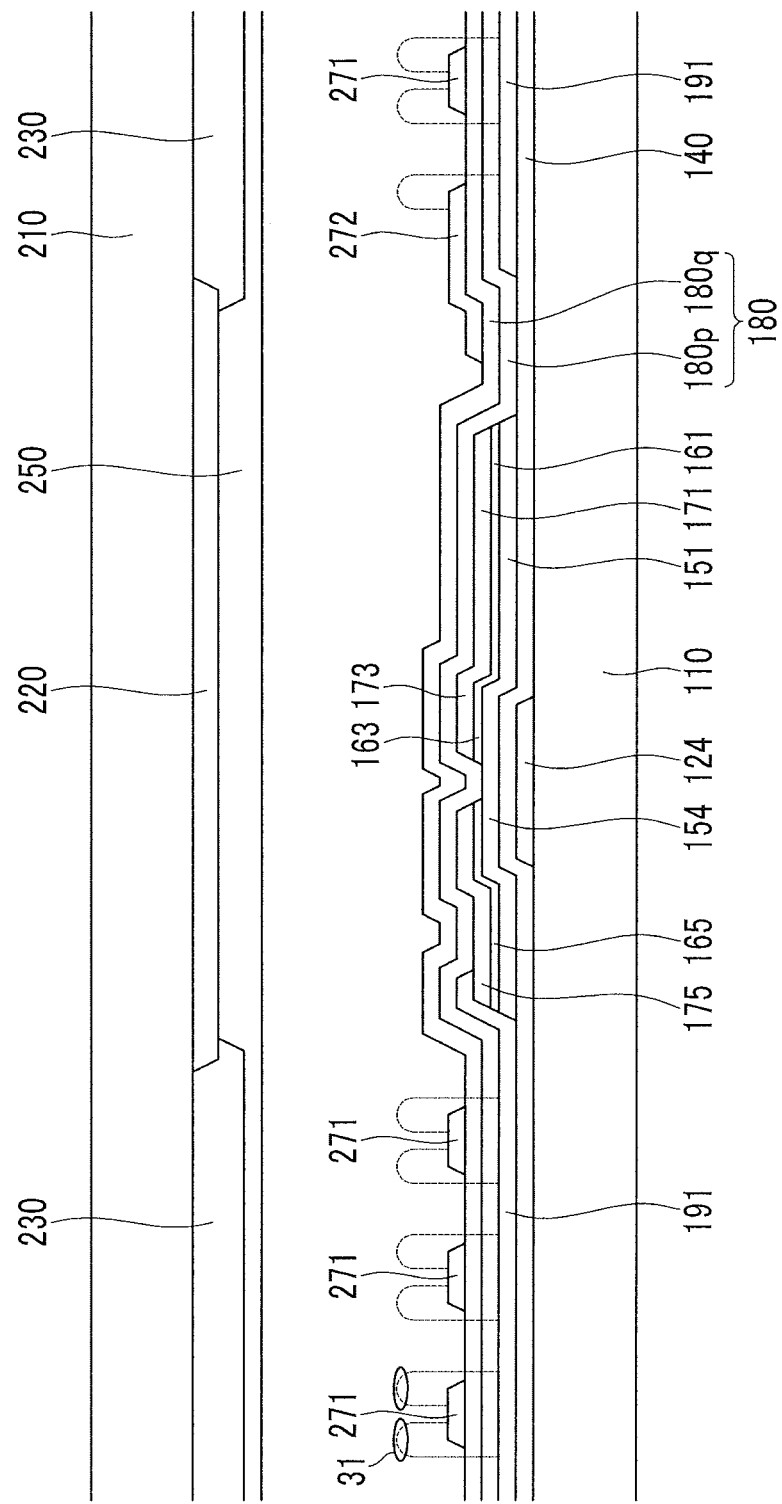
FIG. 23 is a partial cross-sectional view taken along line XXIII-XXIII of FIG. 22.

The liquid crystal display device of FIGS. 22 and 23 is substantially the same as the liquid crystal display device in FIGS. 8 through 10 except for the passivation layer 180. The same or like elements shown in FIGS. 22 and 23 have been labeled with the same reference characters as used above to describe the exemplary embodiments of the liquid crystal display device shown in FIGS. 8 through 10, and any repetitive detailed description thereof will hereinafter be omitted or simplified.

As shown in FIGS. 22 and 23, the gate line 121, which includes the gate electrode 124, and the reference voltage line 131 are disposed on the insulating substrate 110 and the gate insulating layer 140 is disposed on the gate line 121 and the reference voltage line 131. The semiconductor island 154, the ohmic contacts 163 and 165 are disposed on the gate insulating layer 140, and the data line 171 and the drain electrode 175, which include the source electrode 173, are disposed on the gate insulating layer 140 and the ohmic contacts 163 and 165. The pixel electrode 191 is disposed on the gate insulating layer 140 and a portion of the drain electrode 175, and the passivation layer 180 having the contact hole 183 is disposed on the pixel electrode 191, the data line 171, the drain electrode 175 and the exposed semiconductor island 154. The reference electrode 270 including the branch electrode 271 is disposed on the passivation layer 180, overlapping the pixel electrode 191.

As shown in FIG. 23, the liquid crystal display device includes the passivation layer 180 having a dual-layer structure including the first passivation layer 180p and the second passivation layer 180q.

The first passivation layer 180p and the second passivation layer 180q may have different refractive indexes. Specifically, for example, the refractive index of the first passivation layer 180p may be in a range of about 1.4 through about 1.6, and the refractive index of the second passivation layer 180q may be in a range of about 1.6 through about 2.2. The first passivation layer 180p and the second passivation layer 180q may be made of inorganic insulator, e.g., SiNx or SiOx. In an exemplary embodiment, the first passivation layer 180p and the second passivation layer 180q may be made of a same inorganic material. In another exemplary embodiment the first passivation layer 180p and the second passivation layer 180q may be made of different inorganic materials. In an exemplary embodiment, the total thickness of the passivation layer 180 may be in a range of about 5500 Å to about 6500 Å, while the thickness of the first passivation layer 180p and the second passivation layer 180q of the passivation layer 180 may be in a range of about 2800 Å to about 3200 Å.

As described above, the refractive index of the first passivation layer 180p and the second passivation layer 180q may be predetermined during a process of depositing the first passivation layer 180p and the second passivation layer 180q by adjusting the pressure and flow rate of $N_2$ gas that is used in the CVD process according to an exemplary embodiment.

As also described above, the transmittance deterioration, e.g., the haze phenomenon due to crystallization of the pixel electrode 191 and/or the reference electrode 270 made of a transparent material in the manufacturing process of the liquid crystal display device, is effectively prevented by forming the passivation layer 180 in a dual-layer structure including the first passivation layer 180p and the second passivation layer 180q having different refractive index.

The present invention should not be construed as being limited to the exemplary embodiments set forth herein. Rather, these exemplary embodiments are provided so that this disclosure will be thorough and complete and will fully convey the concept of the present invention to those skilled in the art.

In additional exemplary embodiments, for example, the reference electrode may have a surface shape without a specific pattern in the pixel area and the pixel electrode may include a plurality of linear branch electrodes and a branch electrode connection part connecting them. Further, the present invention can be applied to not only when the color filter and light blocking film are formed on the upper plate, but when the color filter and light blocking film are formed on the insulating substrate, as well.

While the present invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:

1. A display device comprising:
    a first substrate;
    a gate line disposed on the first substrate and extending substantially in a first direction;
    a gate electrode protruding from the gate line in a second direction crossing the first direction;
    a common voltage line separated from the gate line;
    a data line crossing the gate line and including a source electrode, the data line having two opposing edges each extending substantially in the second direction;
    a thin film transistor including the gate electrode, the source electrode, a drain electrode opposing the source electrode, and a channel area between the source electrode and the drain electrode;
    a pixel electrode connected to the drain electrode of the thin film transistor;
    a common electrode disposed on the first substrate and overlapping the pixel electrode; and
    an insulating layer between the common voltage line and the common electrode, the insulating layer defining a contact hole,
    wherein
    the common electrode is electrically connected to the common voltage line through the contact hole, and
    the common electrode defines:
        a plurality of slits overlapping the pixel electrode,
        an enclosed opening overlapping the gate electrode, a portion of the gate line which is adjacent to the gate electrode, an entire width of the source electrode along the first direction, the channel area, and the two opposing edges of the data line in a plan view, and
        an outer boundary of the enclosed opening of the common electrode having a first edge crossing the data line, and a second edge crossing the data line,
    wherein
    the outer boundary of the enclosed opening surrounds the gate electrode, and
    the first edge and the second edge oppose each other in the second direction in the plan view with an entirety of the gate electrode and entire width of the gate line along the second direction between the first edge and the second edge.

2. The display device of claim 1, wherein an overlapping portion of the data line overlaps the gate electrode in the plan view and the overlapping portion defines the source electrode.

3. The display device of claim 1, wherein the enclosed opening of the common electrode overlaps an entire width of the gate electrode in the first direction in the plan view.

4. The display device of claim 1, wherein the slits of the common electrode extend substantially parallel to the data line.

5. The display device of claim 1, further comprising a plurality of pixels, wherein
    each of the plurality of pixels comprises the thin film transistor and the pixel electrode, and
    the common electrode overlaps the pixel electrodes of the plurality of pixels.

6. The display device of claim 5, further comprising a plurality of data lines including the data line, wherein
    the common electrode overlaps the plurality of data lines.

7. The display device of claim 1, wherein
    the common voltage line comprises a plurality of expanded portions each protruding in the second direction from a line portion of the common voltage line extending substantially in the first direction, and
    the contact hole is aligned with an expanded portion of the plurality of expanded portions, in the second direction.

8. The display device of claim 7, wherein at least one of the plurality of expanded portions is not aligned with any of the contact hole in the second direction.

9. The display device of claim 1, wherein the enclosed opening of the common electrode does not overlap the contact hole in the plan view.

10. The display device of claim 1, wherein the pixel electrode is between the common electrode and the first substrate.

* * * * *